(12) United States Patent
Wang et al.

(10) Patent No.: US 12,535,562 B2
(45) Date of Patent: Jan. 27, 2026

(54) LiDAR AND DEVICE HAVING LiDAR

(71) Applicant: SUTENG INNOVATION TECHNOLOGY CO., LTD., Shenzhen (CN)

(72) Inventors: Chao Wang, Shenzhen (CN); Kaipeng Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 42 days.

(21) Appl. No.: 18/528,696

(22) Filed: Dec. 4, 2023

(65) Prior Publication Data

US 2024/0118390 A1    Apr. 11, 2024

Related U.S. Application Data

(63) Continuation of application No. 17/857,960, filed on Jul. 5, 2022, now Pat. No. 11,867,837, which is a (Continued)

(30) Foreign Application Priority Data

Apr. 7, 2022    (CN) .......................... 202210362044.3

(51) Int. Cl.
   *G01S 7/481*    (2006.01)
   *G01S 17/02*    (2020.01)

(52) U.S. Cl.
   CPC ........... *G01S 7/4811* (2013.01); *G01S 7/4814* (2013.01); *G01S 7/4816* (2013.01); *G01S 17/02* (2013.01)

(58) Field of Classification Search
   CPC .... G01S 7/4811; G01S 7/4814; G01S 7/4816; G01S 17/02
   See application file for complete search history.

(56) References Cited

U.S. PATENT DOCUMENTS

| | | | |
|---|---|---|---|
| 2011/0141005 A1* | 6/2011 | Jung | G02B 6/0078 362/97.1 |
| 2015/0055117 A1* | 2/2015 | Pennecot | G01S 7/4816 356/4.01 |

(Continued)

FOREIGN PATENT DOCUMENTS

| | | |
|---|---|---|
| CN | 103608696 A | 2/2014 |
| CN | 105659108 A | 6/2016 |

(Continued)

OTHER PUBLICATIONS

First Office Action issued in related Chinese Application No. 202080005557.8, mailed Jun. 30, 2022, 58 pages.

*Primary Examiner* — Jamil Ahmed
(74) *Attorney, Agent, or Firm* — BAYES PLLC

(57) ABSTRACT

This application discloses a LiDAR and a device. The LiDAR includes: a receiving module and a plurality of emission modules, and a combination of emission fields of view of the plurality of emission modules matches the receiving field of view of the receiving module. Each emission module includes a laser and an emission optical component located on a light emission side of the laser. An area of a projection region of a light emission region of the laser of the emission module on a light-incident face of the emission optical component is smaller than an area of the light-incident face. Emission angles of view of the plurality of emission modules are overlapped.

3 Claims, 28 Drawing Sheets

Related U.S. Application Data continuation-in-part of application No. PCT/CN2020/070547, filed on Jan. 6, 2020.

(56) References Cited

U.S. PATENT DOCUMENTS

| | | | | |
|---|---|---|---|---|
| 2018/0364334 A1* | 12/2018 | Xiang | ............ | G01S 17/42 |
| 2019/0377093 A1 | 12/2019 | Wiebold et al. | | |
| 2020/0116558 A1* | 4/2020 | Pacala | ............ | G01J 1/4204 |

FOREIGN PATENT DOCUMENTS

| CN | 206161860 U | 5/2017 |
|---|---|---|
| CN | 108414999 A | 8/2018 |
| CN | 110412602 A | 11/2019 |
| JP | H08327737 A | 12/1996 |
| JP | H08327738 A | 12/1996 |
| JP | 2012173099 A | 9/2012 |

\* cited by examiner

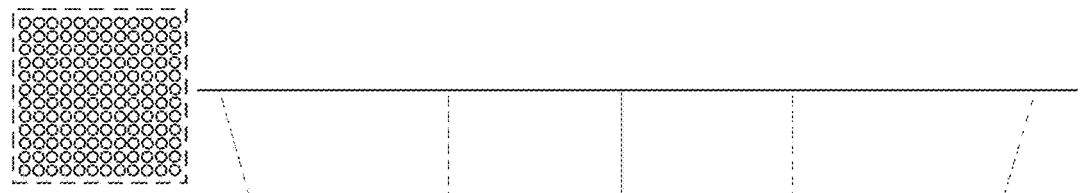
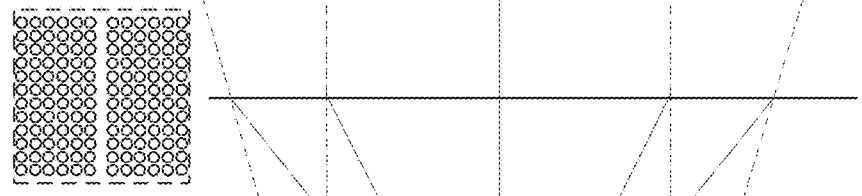
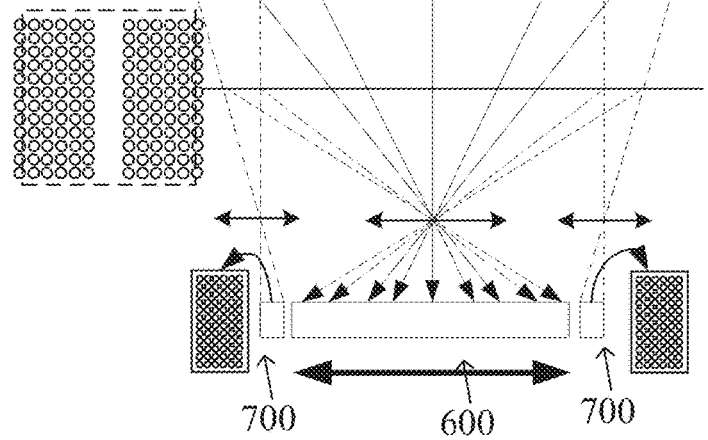
FIG. 16

LiDAR AND DEVICE HAVING LiDAR

CROSS-REFERENCE TO RELATED APPLICATION

The present application is a continuation of application Ser. No. 17/857,960, filed Jul. 5, 2022, which is a continuation-in-part of International Application No. PCT/CN2020/070547, filed on Jan. 6, 2020, and claims the benefit of priority to China Patent Application No. CN202210362044.3, filed Apr. 7, 2022. The contents of the above-mentioned applications are incorporated herein by reference in their entireties.

TECHNICAL FIELD

This application relates to the technical field of laser detection, and in particular, to LiDAR and device having the LiDAR.

BACKGROUND

With development and application of optical technologies, many LiDAR systems that emit laser beams to detect characteristics of a target object, such as a position and a speed, emerge, and the LiDAR systems have been widely applied to various fields, such as distance measuring, tracking and measurement of low-altitude flying targets, weapon guidance, atmospheric monitoring, mapping, warning, and traffic management. Especially, in the field of automated driving, the LiDAR systems are often used to detect and photograph surroundings of a vehicle in a field of view, so that an automated vehicle can plan a correct driving route based on information detected by the LiDAR systems.

Currently, flash LiDAR systems are widely applied to automated vehicles due to their advantages such as simple structures, low system loads, and long lifespans of optical receivers/transmitters, to detect near-field surroundings of the vehicles. A basic working principle of the flash LiDAR system is that a transmitting end emits laser beams to illuminate an entire field of view area to be detected at one time through "floodlight," and a receiving end receives all echo laser beams in the field of view area by using a corresponding detector, to obtain detection information in the field of view area by analyzing the echo laser beams.

However, in the flash LiDAR system, there is a limited range of angles of view for an outgoing laser beam, which causes a relatively large detection blind area to the flash LiDAR system and reduces an obstacle avoidance capability of a vehicle using the flash LiDAR system. In addition, a detection distance of the existing flash LiDAR system is insufficient. To increase the detection distance, transmission power needs to be significantly increased, which greatly increases power consumption, a thermal effect, and device costs of the system.

As an active ranging device, ranging performance of a LiDAR depends on many factors (such as power, stray light, a size of a receiving aperture, and the like). Currently, emission power of a LiDAR is limited by a size of an emission chip. The larger the size of the emission chip, the greater the emission power. In addition, the larger emission chip further makes it more difficult to drive related hardware, and causes inconsistency of uniformity of finally emitted light, which increases manufacturing costs.

In addition, because the LiDAR is limited by a system architecture of the emission chip and a receiving detector, a transceiver system cannot be designed as a coaxial system. If the transceiver system is designed as the coaxial system, the costs and size of the LiDAR are significantly increased. Therefore, currently, an off-axis system is generally designed for the LiDAR. However, such a LiDAR is limited by an aperture of a transceiver lens, and there is certainly a specific distance between an emission lens and a receiving optical component, so that pixels are shifted to some extent. When the LiDAR has one receiving module and a plurality of emission modules, there is usually no point clouds in a middle field of view of the receiving module because of pixel shifting.

Therefore, it is essential to provide a LiDAR detection method and a LiDAR that has a small-sized emission chip and can avoid the lack of point clouds in the middle field of view.

SUMMARY

Embodiments of this application provide a LiDAR and a device including the LiDAR, which can reduce a detection blind spot and effectively improve energy utilization of an outgoing laser beam. In addition, a LiDAR detection method and a LiDAR that has a small-sized laser and can avoid a lack of point clouds in the middle field of view are provided.

According to an aspect of the present application, a LiDAR is provided, and includes: a casing, demarcating an emission chamber and a receiving chamber; a laser emission device, arranged in the emission chamber and configured to emit a laser beam to a first target region; and a plurality of laser receiving devices, arranged in the receiving chamber, where the plurality of laser receiving devices can receive the laser beam reflected from a second target region, and the first target region has at least a part overlapped with the second target region, where the second target region includes a plurality of detection subregions, each detection subregion is smaller than the first target region and has at least a part overlapped with the first target region, and each laser receiving device receives, in a one-to-one correspondence manner, a laser beam reflected from each detection subregion.

In some embodiments, a plurality of laser emission devices are arranged in the emission chamber, the first target region is formed by combining a plurality of emission subregions, and each laser emission device emits the laser beam to each emission subregion in a one-to-one correspondence manner.

In some embodiments, the number of laser emission devices is the same as the number of laser receiving devices, and each laser receiving device receives, in a one-to-one correspondence manner, the laser beam emitted by each laser emission device to and reflected back from the first target region.

In some embodiments, there are two laser emission devices, namely a first emission device and a second emission device, where the first emission device emits a laser beam to a first emission subregion, the second emission device emits a laser beam to a second emission subregion, and the first target region is formed by combining the first emission subregion and the second emission subregion, and where there are two laser receiving devices, namely a first receiving device and a second receiving device, and the first receiving device and the second receiving device are configured to receive the laser beam reflected back from the first target region.

In some embodiments, the first receiving device is configured to receive light from a first detection subregion, and the first detection subregion is located in the first emission subregion.

The second receiving device is configured to receive light from a second detection subregion, and the second detection subregion is located in the second emission subregion.

In some embodiments, the first emission subregion and the second emission subregion have an overlapped part, and where the LiDAR further includes a control device, and the control device is configured to control on-off of the first emission device and the second emission device, so that the first receiving device receives the laser beam emitted by the first emission device to the first detection subregion and the second receiving device receives the laser beam emitted by the second emission device to the second detection subregion.

In some embodiments, the casing includes: an outer casing, demarcating an inner chamber, where the outer casing includes a first translucent plate and two second translucent plates; and an inner casing, arranged in the inner chamber, where the inner casing is connected to an inner wall surface of the outer casing, and the inner casing divides the inner chamber into an emission chamber and a receiving chamber, and where the first translucent plate faces the emission chamber, and laser beams emitted by the first emission device and the second emission device pass through the first translucent plate and are directed outside the LiDAR, and where both the second translucent plates face the receiving chamber, the first receiving device receives the laser beam passing through one of the second translucent plates, and the second receiving device receives the laser beam passing through the other second translucent plate.

In some embodiments, the outer casing includes: two opposite end plates; and a side wall plate, located between the two end plates and demarcating the inner chamber together with the two end plates, where the side wall plate includes an emission wall, a first receiving wall, and a second receiving wall, and along a circumferential direction of the side wall plate, the first receiving wall and the second receiving wall are respectively located at two ends of the emission wall, the first translucent plate is arranged on the emission wall, and the two second translucent plates are arranged on the first receiving wall and the second receiving wall in a one-to-one correspondence manner, where the inner casing is separately connected to the two end plates and the emission wall, and demarcates the emission chamber together with the emission wall and the two end plates.

In some embodiments, the emission wall, the first receiving wall, and the second receiving wall are all plate-shaped, the first receiving wall and the emission wall form a first included angle, the second receiving wall and the emission wall form a second included angle, and the first included angle and the second included angle are equal and both are obtuse angles less than 180 degrees.

In some embodiments, the inner casing includes a first plate body and a second plate body, the first plate body and the second plate body are respectively connected to the emission wall and the two end plates, the first plate body and the second plate body form an obtuse angle, the first emission device is provided on a surface of the first plate body facing the emission chamber, and the second emission device is provided on a surface of the second plate body facing the emission chamber.

In some embodiments, the first receiving device has a first optical path axis, where the first optical path axis is perpendicular to the second translucent plate intersecting with the first optical path axis, the second receiving device has a second optical path axis, the second optical path axis is perpendicular to the second translucent plate intersecting with the second optical path axis, and an included angle between the first optical path axis and the second optical path axis is greater than 45 degrees.

In some embodiments, the first receiving device has a first conical detection field, where the first conical detection field has a first margin edge line adjacent to the emission wall, the second receiving device has a second conical detection field, the second conical detection field has a second margin edge line adjacent to the emission wall, the first margin edge line intersects with the second margin edge line, and an intersection is located on a side of a surface of the emission wall facing a detected object.

According to a second aspect of the embodiments of this application, a device is further provided and includes a LiDAR which further comprises:

a casing, demarcating an emission chamber and a receiving chamber;

a laser emission device, arranged in the emission chamber and configured to emit a laser beam to a first target region; and a plurality of laser receiving devices, arranged in the receiving chamber, where the plurality of laser receiving devices can receive the laser beam reflected from a second target region, and the first target region has at least a part overlapped with the second target region, where the second target region comprises a plurality of detection subregions, each detection subregion is smaller than the first target region and has at least a part overlapped with the first target region, and each laser receiving device receives, in a one-to-one correspondence manner, a laser beam reflected from each detection subregion.

According to another aspect of this application, a LiDAR is provided and includes a receiving module and a plurality of emission modules, and a combination of emission fields of view of the plurality of emission modules matches the receiving field of view of the receiving module, where each emission module includes a laser and an emission optical component located on a light emission side of the laser; an area of a projection region of a light emission region of the laser of the emission module on a light-incident face of the emission optical component is smaller than an area of the light-incident face; and emission angles of view of the plurality of emission modules are overlapped.

In some embodiments, the receiving module has a first optical axis; and the emission optical component has a second optical axis, configured to direct at least some laser beams to be emitted toward the side on which the first optical axis is located.

Further, second optical axes of the emission optical components of the plurality of emission modules are all parallel to the first optical axis of the receiving optical components; and centers of light emission regions of the lasers of the plurality of emission modules are located on a side of the second optical axes of their respective emission optical components away from the first optical axis.

In some embodiments, the emission optical component is configured to perform angle reducing and beam expanding processing on a laser beam emitted by the laser; each emission optical component includes an angle reducing component and a beam expanding component; the angle reducing component includes at least one lens, and is configured to reduce a divergence angle of the laser beam and direct at least some laser beams to be emitted toward the side on which the first optical axis is located; and the beam expanding component includes at least one lens, and is configured to expand a total emission angle of view of the laser beam.

In some embodiments, the second optical axis of the emission optical component of the emission module and the first optical axis of the receiving optical component form an acute angle; and the emission optical component is configured to perform angle reducing and beam expanding processing on a laser beam emitted by the laser, so that emission angles of view of the plurality of emission modules are overlapped.

In some embodiments, each emission optical component includes an angle reducing component, a beam expanding component, and an optical homogenizer arranged along an emission optical path of the laser beam. The angle reducing component includes at least one lens, and is configured to reduce a divergence angle of the laser beam; and the beam expanding component includes at least one lens, and is configured to expand a total emission angle of view of the laser beam. The optical homogenizer is configured to expand a light spot of the laser beam, so that the emission angles of view of the plurality of emission modules are overlapped.

In some embodiments, the receiving module includes a receiving optical component and a receiving sensor located on a light emission side of the receiving optical component; the receiving optical component includes a beam reducing component and a focusing component arranged along a transmission optical path of an echo signal; the beam reducing component includes at least one lens configured to reduce a total receiving angle of view of the echo signal; and the focusing component includes at least one lens configured to focus the echo signal on the receiving sensor after the angle of view is reduced by the beam reducing component.

Further, distortion of each emission optical component of the plurality of emission modules matches that of a receiving optical component of the receiving module.

In some embodiments, each emission optical component includes at least one lens, and satisfies the following conditional formula: $|m1|\leq 0.25\%$, where m1 is f-theta distortion of the emission optical component, and $|m1|$ is an absolute value of the f-theta distortion of the emission optical component; and the receiving optical component includes at least one lens, and satisfies the following conditional formula: $|n1|\leq 0.25\%$, where n1 is f-theta distortion of the receiving optical component, and $|n1|$ an absolute value of the f-theta distortion of the receiving optical component.

Further, the laser includes a first light emission unit and a second light emission unit that are alternately arranged on an emission board along a first direction, the first light emission unit includes first light sources spaced along a second direction, the second light emission unit includes second light sources spaced along a second direction, the second light source is located between two adjacent first light sources, and the second direction is perpendicular to the first direction.

According to a second aspect, a LiDAR detection method is provided, where based on the LiDAR provided in the foregoing embodiments, the method includes the following steps: obtaining a distance to a target; calculating a pixel shifting parameter based on the distance to the target, where the pixel shifting parameter includes any one of a pixel shifting angle, a shifting size and the number of shifted pixels; determining a correspondence between a laser in the emission module and a receiving sensor in the receiving module based on the pixel shifting parameter; and controlling the lasers in the emission module to emit light in the preset timing sequence, and further controlling the receiving sensor in the receiving module to receive an echo signal in a corresponding time interval based on the correspondence with the laser, where the corresponding time interval is within a preset time interval after the corresponding laser emits the light.

Compared with the related art, a technical effect of the present application is as follows. The LiDAR provided in this embodiment of the present application includes a receiving module and a plurality of emission modules. A combination of emission fields of view of the plurality of emission modules matches the receiving field of view of the receiving module, and therefore, a size of the laser used for the single emission module can be reduced, so that power and costs of the single emission module can be effectively reduced and related hardware driver can be further easier to operate. In addition, a position and a light-emission effect of the single emission module are also easy to adjust, to more easily ensure that light emitted by the plurality of emission modules is evenly distributed.

In addition, the emission module includes an emission optical component and a laser, and an area of a projection region of the laser on a light-incident face of the emission optical component is smaller than an area of the light-incident face, and the emission optical component is configured to direct the laser beam, so that emission angles of view of the plurality of emission modules are overlapped. The overlapped region covers a central field of view, so that there is still a laser beam being emitted in the central field of view when the LiDAR performs short-distance detection even if there is pixel shifting, to ensure that there is a point cloud in the central field of view of the receiving module, thereby effectively avoiding the lack of point cloud in the central field of view of the receiving module. Further, a center of a light emission region is located on a side of a second optical axis away from the receiving module; and the emission optical component has a second optical axis and is configured to direct at least some laser beams to be emitted toward the side on which the first optical axis is located, so that the emission fields of view of the plurality of emission modules are overlapped. With such structure, the size of the laser used for the single emission module can be further reduced, and an inherent mode is also changed in which all laser beams emitted by the small-sized laser in an ordinary LiDAR are directed toward a direction away from the first optical axis. An outgoing direction of at least some laser beams emitted by the laser is set as a direction facing the side on which the first optical axis is located, so that emission fields of view of the plurality of emission modules are overlapped. The overlapped region covers a central field of view, so that there is still a laser beam being emitted in the central region of the target when the LiDAR performs short-distance detection even if there is pixel shifting, to ensure that there is the point cloud in the central field of view of the receiving module, thereby effectively avoiding the lack of point cloud in the central field of view of the receiving module. In conclusion, because the LiDAR is an off-axis system, by setting the detection angles of view of the emission device and the receiving device, at least a part of the emission angle of view of the emission device and the receiving angle of view of the receiving device are overlapped, thereby effectively reducing a detection blind spot of the LiDAR.

This application provides a LiDAR, the laser emission device and the laser receiving device are arranged independently in the LiDAR, and there are at least two laser receiving devices. Compared with the structure with only one laser receiving device in the related art, by adding the plurality of laser receiving devices, the receiving field of view can be enlarged and the detection angle of view is increased, thereby reducing a detection blind spot of the LiDAR.

Another LiDAR provided in this application includes a receiving module and a plurality of emission modules. A combination of emission fields of view of the plurality of emission modules matches the receiving field of view of the receiving module, and therefore, a size of the laser used for the single emission module can be reduced, so that power and costs of the single emission module can be effectively reduced and related hardware drivers can be further easier to operate. In addition, a position and a light-emission effect of the single emission module are also easy to adjust, to more easily ensure that light emitted by the plurality of emission modules is evenly distributed.

In addition, the emission module includes an emission optical component and a laser, and an area of a projection region of the laser on a light-incident face of the emission optical component is smaller than an area of the light-incident face, and the emission optical component is configured to direct the laser beam, so that emission angles of view of the plurality of emission modules are overlapped. The overlapped region covers a central field of view, so that there is still a laser beam being emitted in the central field of view when the LiDAR performs short-distance detection even if there is pixel shifting, to ensure that there is the point cloud in the central field of view of the receiving module, thereby effectively avoiding the lack of point cloud in the central field of view of the receiving module. Further, a center of a light emission region is located on a side of a second optical axis away from the receiving module; and the emission optical component has a second optical axis and is configured to direct at least some laser beams to be emitted toward the side on which the first optical axis is located, so that the emission fields of view of the plurality of emission modules are overlapped. With such structure, the size of the laser used for the single emission module can be further reduced, and an inherent mode is also changed in which all laser beams emitted by the small-sized laser in the ordinary LiDAR are directed toward a direction away from the first optical axis. An outgoing direction of at least some laser beams emitted by the laser is set as a direction facing the side on which the first optical axis is located, so that emission fields of view of the plurality of emission modules are overlapped. The overlapped region covers a central field of view, so that there is still a laser beam being emitted in the central region of the target when the LiDAR performs short-distance detection even if there is pixel shifting, to ensure that there is a point cloud in the central field of view of the receiving module, thereby effectively avoiding the lack of point cloud in the central field of view of the receiving module.

In addition, the lack of point cloud in the central field of view of the receiving module can be avoided while ensuring the small size of the single laser. The LiDAR detection method provided in the embodiments of the present application is implemented based on the LiDAR provided in the embodiments of the present application, and can also achieve the foregoing effects.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person skilled in the art may still derive other drawings from these accompanying drawings without creative efforts.

FIG. 16 is a schematic diagram of a light-emission effect of an off-axis optical system in the related art;

DETAILED DESCRIPTION

To make the objectives, technical solutions, and advantages of this application more comprehensible, the following further describes this application in detail with reference to accompanying drawings and embodiments. It should be understood that the specific embodiments described herein are merely used to explain this application but are not intended to limit this application.

A LiDAR provided in this application can be applied to any device that needs laser detection, such as a vehicle. The LiDAR can detect parameters such as a distance and a speed of the vehicle relative to an obstacle. The vehicle detects a moving or approaching obstacle nearby through a LiDAR system, such as a taller vehicle, a still object on a roadside, or an abruptly approaching flying object, so that the vehicle can plan a path based on detected information to avoid the obstacle and the vehicle can avoid collision with the obstacle. The vehicle may be an automated vehicle or a common vehicle. This is not limited in this application.

Currently, a method for identifying an obstacle by a vehicle through a LiDAR system in a surrounding environment has been widely applied, and especially the flash LiDAR system is widely applied to near-field detection of the vehicle. However, output power, an angle of view, and the like of a light source of a conventional flash LiDAR system are fixed, which causes a large-area blind spot in front of or on both sides of the vehicle using the LiDAR system, thereby reducing an obstacle avoidance capability of the vehicle. Therefore, in view of the foregoing problem, this application proposes a LiDAR and a device including the LiDAR, to resolve the foregoing problem.

As shown in FIG. 1 to FIG. 9, this embodiment provides a LiDAR 10, and the LiDAR 10 can enlarge a detection angle of view to reduce a detection blind spot. Specifically, the LiDAR 10 may include a casing 100, a laser emission device, and a plurality of (two or more) laser receiving devices.

Figure 1:
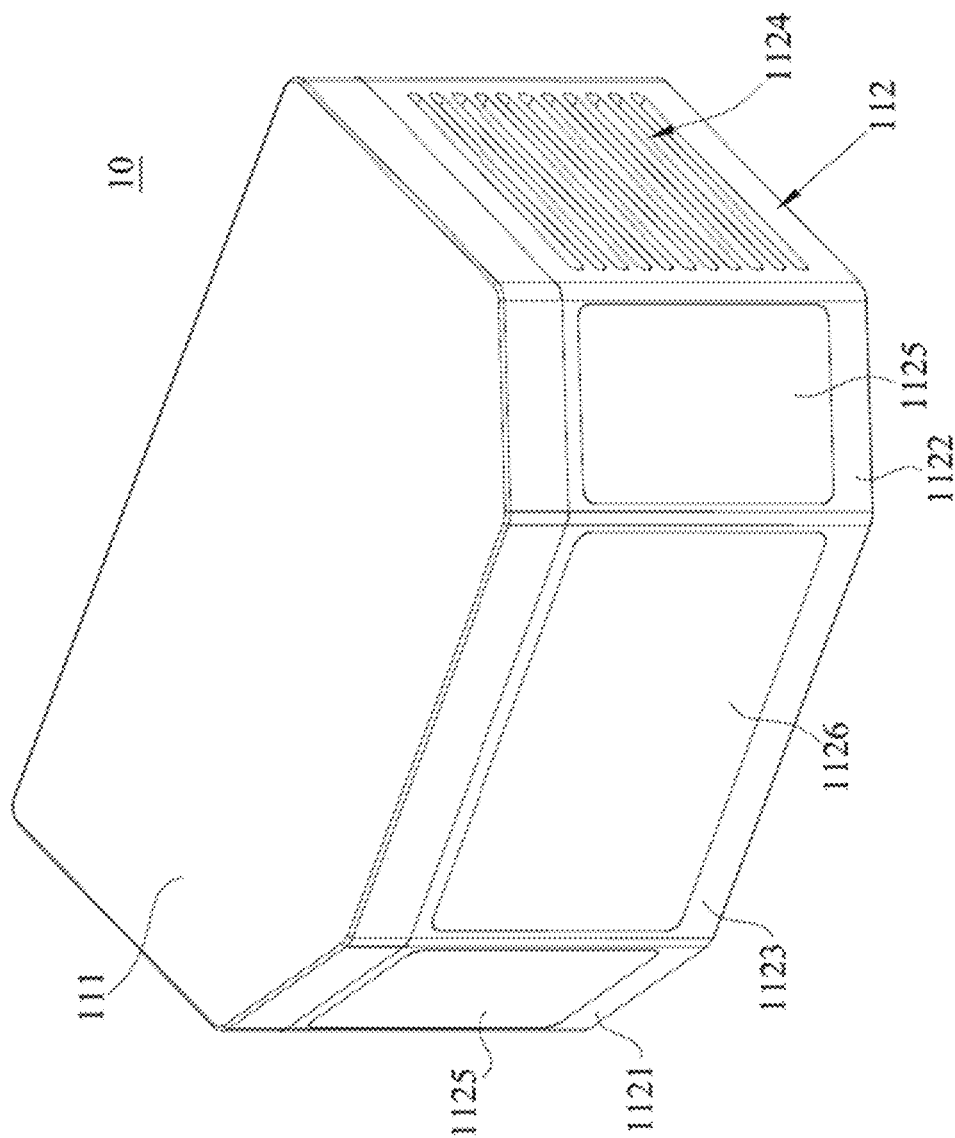
FIG. 1 is a schematic stereogram of a LiDAR according to an embodiment of this application.
Figure 2:
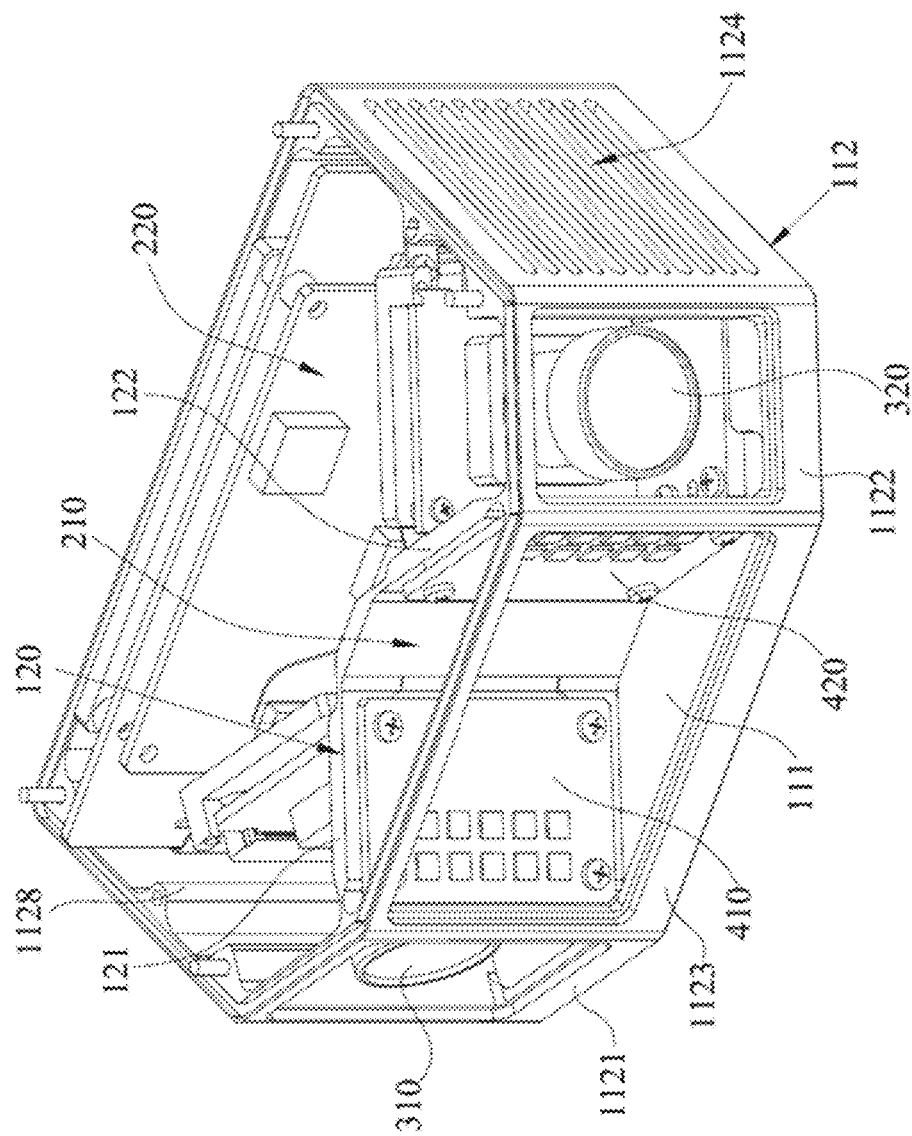
FIG. 2 is a three-dimensional schematic diagram of a combination of a casing, a laser emission device, and a laser receiving device of a LiDAR according to an embodiment of this application.

The casing 100 demarcates an inner chamber 200, and the inner chamber 200 can be divided into an emission chamber 210 and a receiving chamber 220, for example, as shown in FIG. 2. The laser emission device is arranged in the emission chamber 210, and the laser receiving devices are arranged in the receiving chamber 220. The inner chamber 200 may only include the emission chamber 210 and the inner chamber 200. Alternatively, the inner chamber 200 may include other spaces in addition to the emission chamber 210 and the receiving chamber 220. For example, some spaces can be separated from the inner chamber to accommodate a component such as a circuit board of the LiDAR, etc. Because there is a precision device such as a control chip on the circuit board, the laser emission device is usually at a high temperature, and the precision device is apt to be affected by the temperature. Thus, to protect the precision device, a heat insulation material can be used to form an isolated heat insulation chamber inside the inner chamber, so that the precision device is arranged in the heat insulation chamber to achieve a good protection effect.

In this embodiment, the inner chamber 200 includes the emission chamber 210 and the receiving chamber 220. The emission chamber 210 and the receiving chamber 220 are only divided by their functions. It should be noted that the emission chamber 210 and the receiving chamber 220 may be connected to each other, and only virtual division is performed. However, when the emission chamber 210 and the receiving chamber 220 are connected, because a laser beam generated by the laser emission device is easily scattered on a side wall of the inner chamber 200 or reflected by an optical device, if a scattered or reflected laser beam enters the receiving device, interference is caused and detection precision of the LiDAR 10 is affected. Therefore, in a preferred embodiment, the emission chamber 210 and the receiving chamber 220 may also be separated by using an isolation part, so that the emission chamber 210 and the receiving chamber 220 are relatively independent parts.

Figure 3:
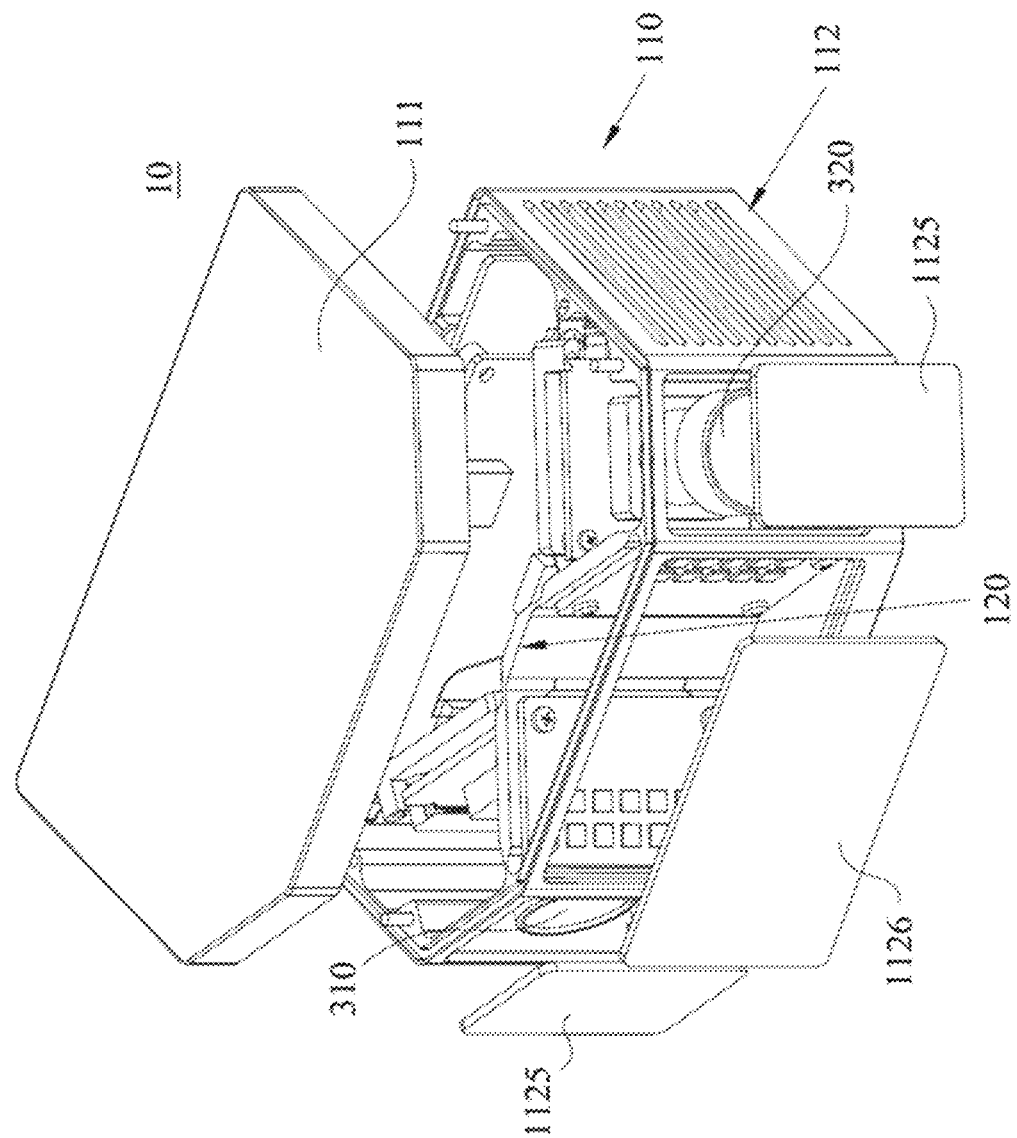
FIG. 3 is a first exploded schematic view of a LiDAR according to an embodiment of this application.

In this embodiment, the emission chamber 210 and the receiving chamber 220 are two relatively independent separated parts. Specifically, the casing 100 of the LiDAR 10 may include an outer casing 110 and an inner casing 120. The outer casing 110 demarcates the foregoing inner chamber 200, and the inner casing 120 divides the inner chamber 200 into the foregoing emission chamber 210 and receiving chamber 220. In addition, to facilitate transmission of the laser beam emitted from the emission chamber 210 to the outside of the casing 100 and transmission of the laser beam outside the casing 100 to the receiving chamber 220 in the casing 100, the outer casing 110 may include a first translucent plate 1126 and a second translucent plate 1125, for example, as shown in FIG. 3. The first translucent plate 1126 faces the emission chamber 210, and is configured to transmit the laser beam generated in the emission chamber 210 to the outside of the casing 100. The second translucent plate 1125 faces the receiving chamber 220, and is configured to transmit the laser beam reflected back from the outside of the casing 100 to the inside of the casing 100. Specific arrangement positions of the first translucent plate 1126 and the second translucent plate 1125 on the outer casing 110 depend on a specific condition.

There may be one or more laser emission devices. When there is one laser emission device, the plurality of laser receiving devices simultaneously receive a laser beam that is emitted by the laser emission device and reflected by the detected object. When there are a plurality of laser emission devices, each laser receiving device can also simultaneously receive laser beams that are emitted by all the laser emission devices and reflected back from the detected object. Particularly, when there are a plurality of laser emission devices, the number of laser emission devices can be the same as the number of laser receiving devices. In this case, each laser receiving device can only correspondingly receive one laser beam emitted by one laser emission device and reflected back by the detected object. With such a structure, a system design can be simplified, a solving difficulty of a rear end of the receiving device is reduced, crosstalk of light is reduced, and it is easier to assemble and perform light adjustment. In addition, when a specific laser emission device is faulty, only one laser receiving device is affected, and detection ranges of all laser receiving devices are not all affected, thereby improving applicable performance.

It should be noted that, in this embodiment, regardless of whether there is one or more laser emission devices, it is considered that each laser emission device emits a laser beam to the first target region. When there is one laser emission device, a laser beam emitted by the laser emission device covers the first target region. When there are a plurality of laser emission devices, a whole region covered by laser beams emitted by the laser emission devices is the first target region. That is, the first target region is formed by combining a plurality of emission subregions, and each laser emission device emits a laser beam to each emission subregion in a one-to-one correspondence manner. In addition, emission subregions may be partially overlapped, completely overlapped, or non-overlapped. It should be noted that because both the emission region and the receiving region are conical, the foregoing "overlapping" only represents a state within a proper detection distance of the LiDAR (for example, when the receiving region and the emission region are at positions extremely close to the LiDAR and cannot be overlapped, an overlapping state at the positions is thus omitted). A proper detection distance depends on the application scenario of the LiDAR.

In addition, when each laser receiving device only correspondingly receives a laser beam emitted by one laser emission device and reflected back by the detected object, to reduce crosstalk between pipelines (that is, to prevent a laser beam emitted by the first emission device from being mistakenly received by the second receiving device, and to prevent a laser beam emitted by the second emission device from being mistakenly received by the first receiving device), in an embodiment, a part of emission regions can be overlapped, and each laser receiving device only receives a laser beam reflected by a part of each emission subregion that is not overlapped with another emission region. In another embodiment, none of the emission subregions may be overlapped. Preferably, in another embodiment, the LiDAR 10 may further include a control device. The control device is configured to control on-off of a first emission device 410 and a second emission device 420, so that a first receiving device 310 receives the laser beam emitted by the first emission device 410 to the first detection subregion and a second receiving device 320 receives the laser beam emitted by the second emission device 420 to the second detection subregion. After the control device is added, each emission subregion is not affected regardless whether they are overlapped.

A specific control process of the control device may be as follows. Within a specific period of time, one laser emission device is started and emits a laser beam, and the other laser emission devices do not emit laser beams. In this case, one corresponding laser receiving device is started and receives a reflected laser beam emitted by the laser emission device. In the next period of time, another laser emission device is started and emits a laser beam, and the other laser emission devices do not emit laser beams. In this case, a laser receiving device corresponding to the foregoing laser emission device is started and receives a reflected laser beam emitted by the laser emission device. By repeating the above, a time interval is reduced to a proper amount of time, so that a complete detection effect can be achieved.

The plurality of laser receiving devices in this embodiment are all arranged in the receiving chamber 220. The plurality of laser receiving devices can receive a laser beam reflected from a second target region, and the first target region and the second target region have at least an overlapped part. It should be noted that the second target region includes a plurality of detection subregions, each detection subregion is smaller than the first target region and has at least a part overlapped with the first target region, and each laser receiving device receives, in a one-to-one correspondence manner, a laser beam reflected from each detection subregion. Particularly, the second target region may completely belong to the first target region, or may only partially belong to the first target region. Because the laser receiving device can only receive the laser beam reflected from the first target region, to improve utilization of the receiving field of view, preferably, the second target region completely belongs to the first target region.

In the LiDAR 10 provided in this embodiment, the laser emission device and the laser receiving device are arranged independently, and there are at least two laser receiving devices. Compared with the structure with only one laser receiving device in the related art, the plurality of laser receiving devices are added, which can enlarge the receiving field of view and increase the detection angle of view, thereby reducing a detection blind spot of the LiDAR 10.

Figure 4:
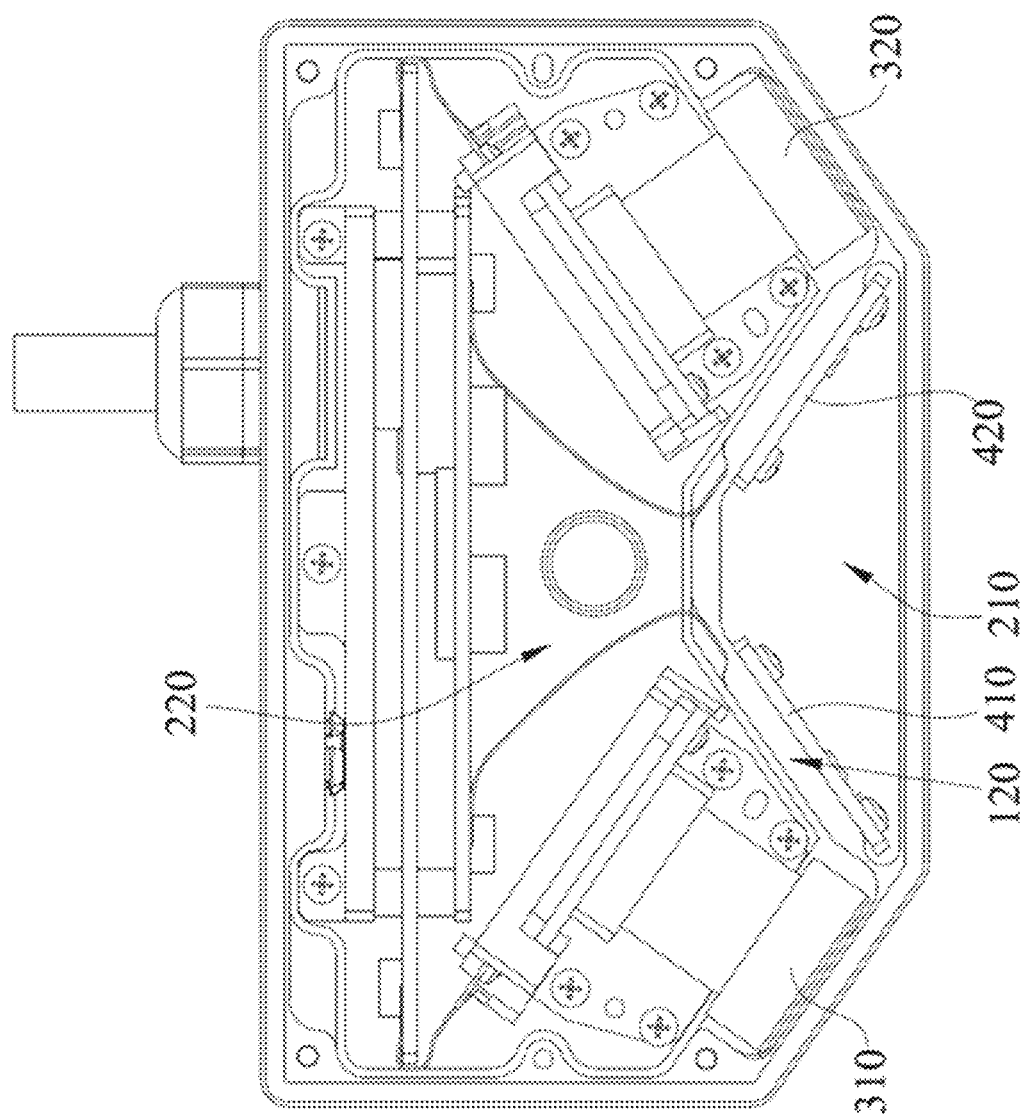
FIG. 4 is a first full cross-sectional schematic view of a LiDAR according to an embodiment of this application.
Figure 5:
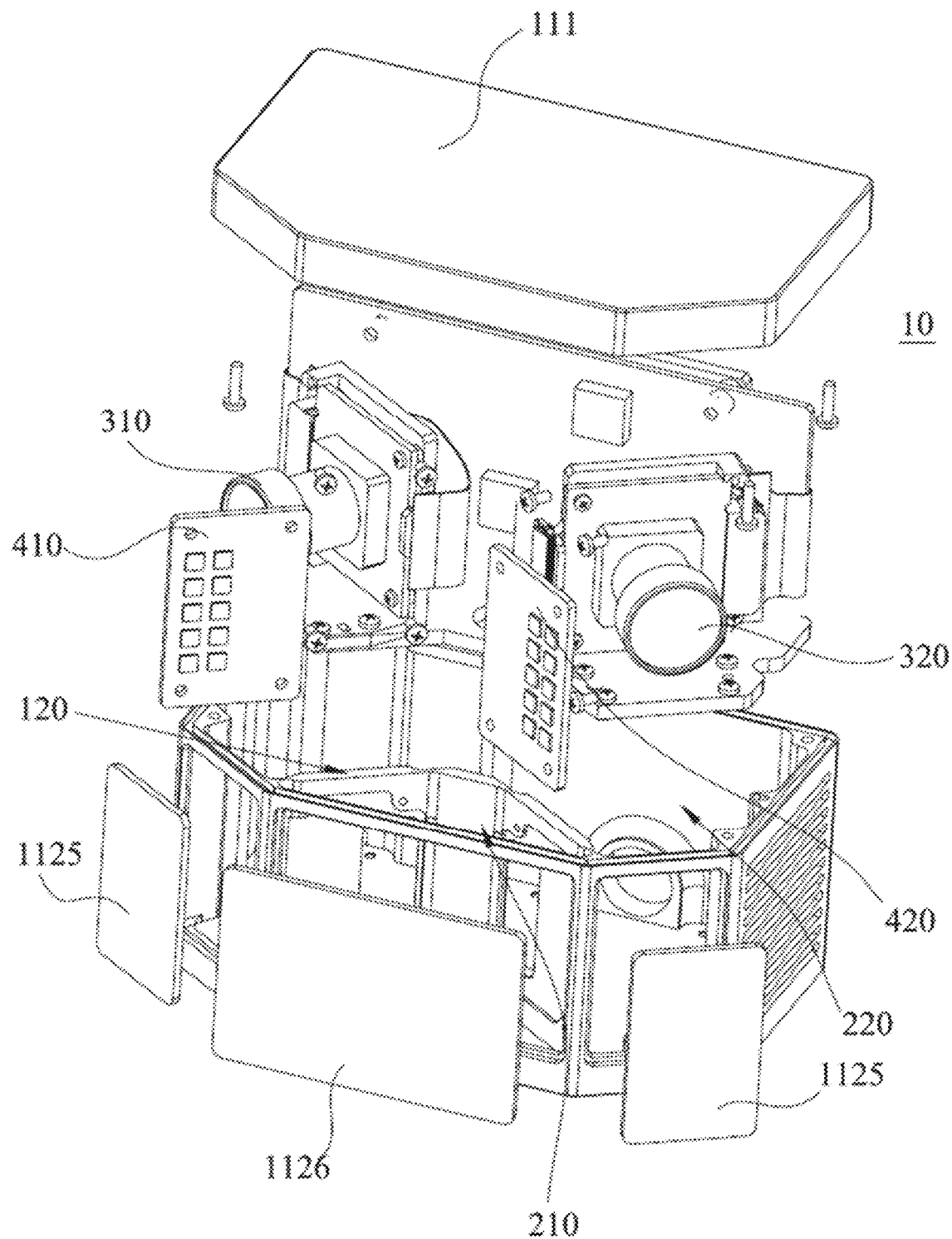
FIG. 5 is a second exploded schematic view of a LiDAR according to an embodiment of this application.
Figure 6:
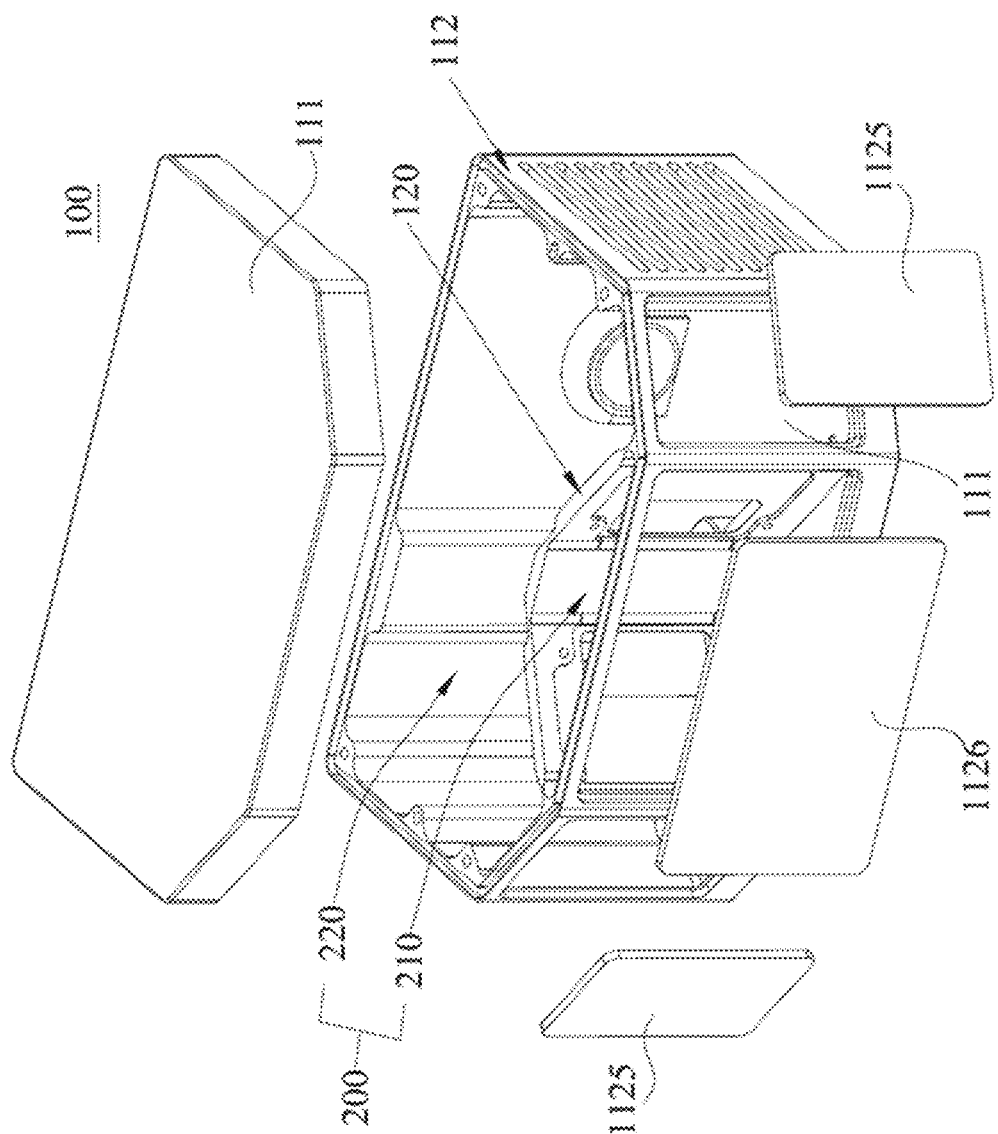
FIG. 6 is an exploded schematic view of a casing of a LiDAR according to an embodiment of this application.
Figure 7:
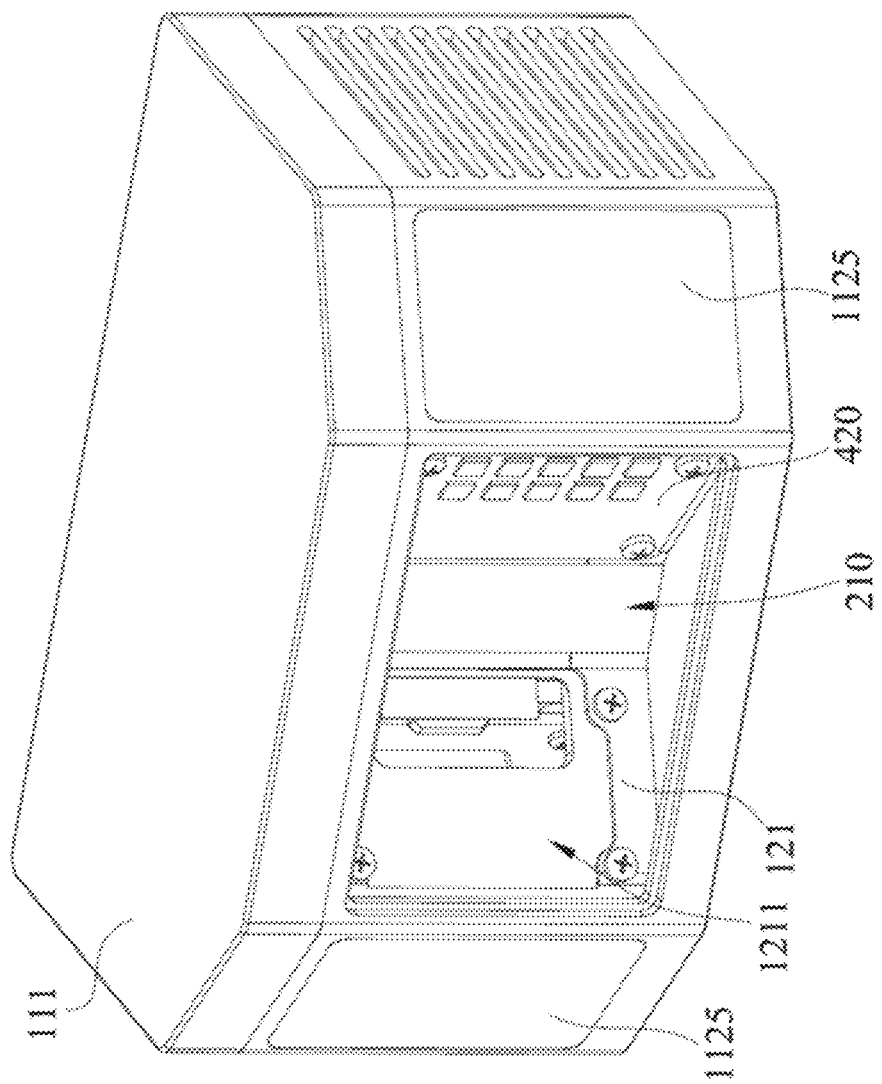
FIG. 7 is a schematic stereogram of a partial casing of a LiDAR and a laser emission device according to an embodiment of this application.

As shown in FIG. 2 to FIG. 4, in an embodiment, there may be two laser emission devices. For ease of description, the two laser emission devices are referred to as the first emission device 410 and the second emission device 420. The first emission device 410 emits a laser beam toward the first emission subregion (namely, one corresponding emission subregion of the foregoing plurality of emission subregions), and the second emission device 420 emits a laser beam toward the second emission subregion (namely, another corresponding emission subregion of the foregoing plurality of emission subregions), and the first target region is formed by combining the first emission subregion and the second emission subregion. The first emission subregion and the second emission subregion may be partially overlapped, completely overlapped, or non-overlapped. Preferably, the first emission subregion and the second emission subregion may be partially overlapped to implement full coverage of the entire detection field of view. A specific situation is described above. Details are not described herein again.

Figure 8:
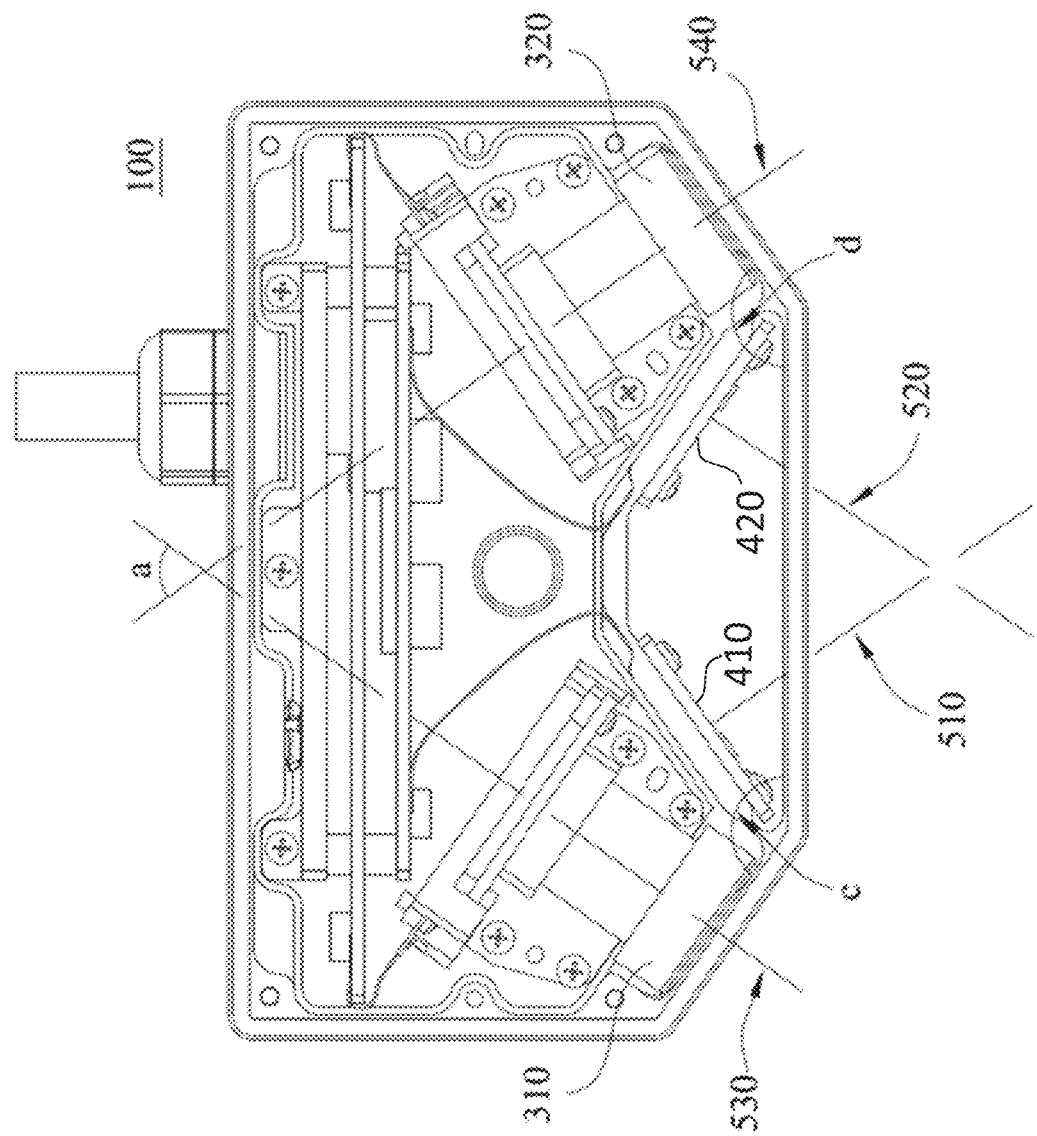
FIG. 8 is a second full cross-sectional schematic view of a LiDAR according to an embodiment of this application.
Figure 9:
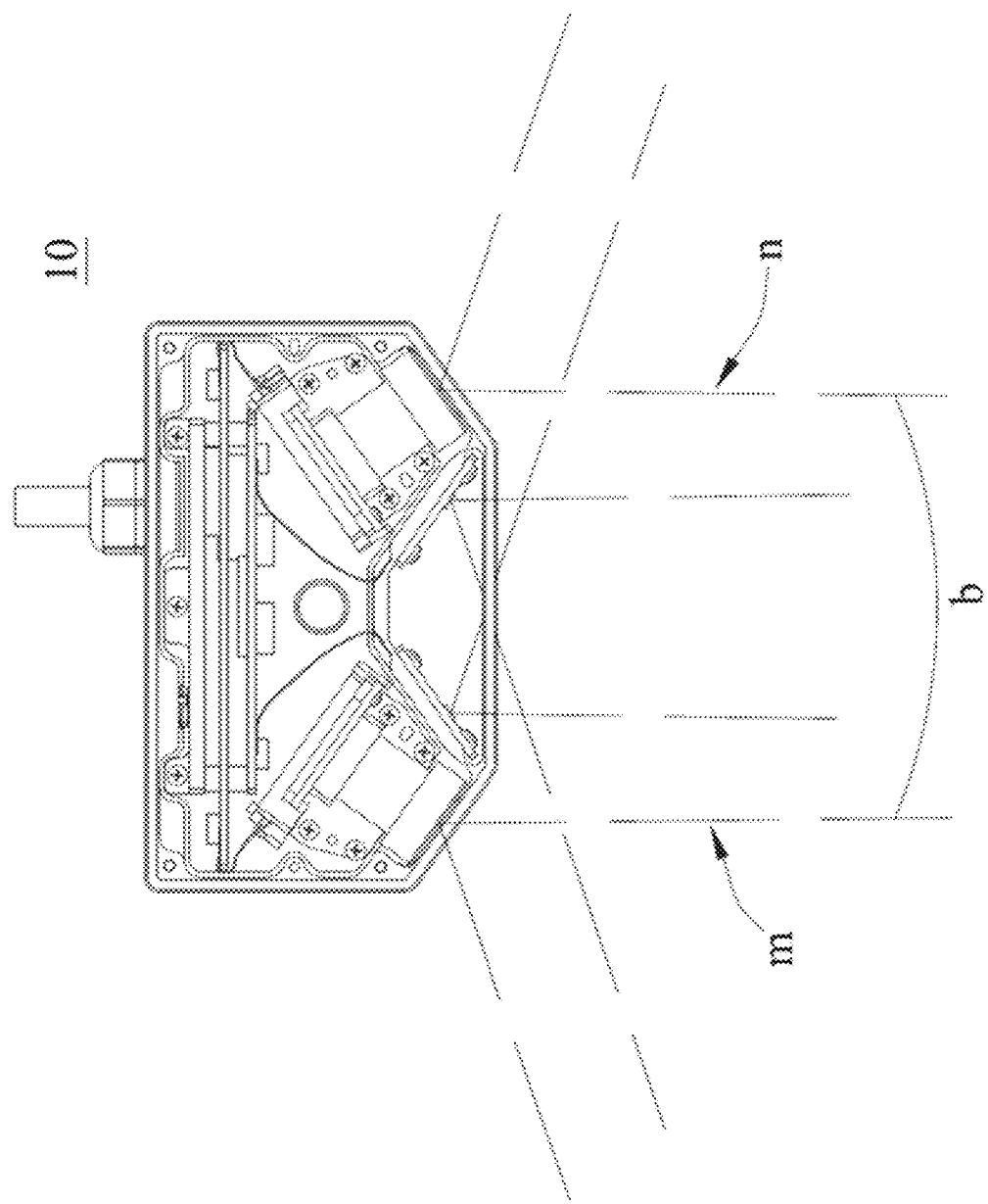
FIG. 9 is a third full cross-sectional schematic view of a LiDAR according to an embodiment of this application.

When there are two laser emission devices, there may also be two laser receiving devices. For ease of description, the two laser receiving devices are referred to as a first receiving device 310 and a second receiving device 320, and both the first receiving device 310 and the second receiving device 320 are configured to receive the laser beam reflected back from the first target region. When the LiDAR 10 has two receiving devices and two emission devices, in an embodiment, as shown in FIG. 8 and FIG. 9, the two laser emission devices may be located between the two laser receiving devices. Specifically, an emission field of view of the first emission device 410 is located between an emission field of view of the second emission device 420 and a receiving field of view of the second receiving device 320, and an emission field of view of the second emission device 420 is located between an emission field of view of the first emission device 410 and a receiving field of view of the first receiving device 310. In addition, in this case, a laser beam emitted by the first emission device 410 and received by the first receiving device 310 can be directed toward the right side (with reference to orientation shown in the figure), so that a laser beam emitted by the second emission device 420 and received by the second receiving device 320 can be directed toward the left side (with reference to orientation shown in the figure).

In this embodiment, the first receiving device 310 is configured to receive light from the first detection subregion, and the first detection subregion is located in the first emission subregion. Certainly, in another embodiment, the first detection subregion may also be located partially outside the first emission subregion, and in this case, the first receiving device can only receive a laser beam reflected by a part of the first detection subregion that is located in the first emission subregion. The second receiving device 320 is configured to receive light from a second detection subregion, and the second detection subregion is located in the second emission subregion. In addition, when the first emission subregion and the second emission subregion have an overlapped part, to prevent the laser beam emitted by the second emission device 420 from being reflected to the first receiving device 310 and prevent the laser beam emitted by the first emission device 410 from being reflected to the second receiving device 320, the first detection subregion may be located at a position of the first emission subregion other than the foregoing overlapped part, and the second detection subregion may be located at a position of the second emission subregion other than the foregoing overlapped part. Particularly, because diffuse reflection of light occurs in the detection region and causes light crosstalk, even if the foregoing solution is used, the problem of light crosstalk cannot be completely resolved. Preferably, the LiDAR 10 in this embodiment may further include a control device (not shown in the figure). The control device is configured to control on-off of the first emission device 410 and the second emission device 420, so that the first receiving device 310 receives the laser beam emitted by the first emission device 410 to the first detection subregion and the second receiving device 320 receives the laser beam emitted by the second emission device 420 to the second detection subregion. A specific working principle of the control device is described above. Details are not described herein again. The control device can ensure that only the first receiving device receives the light reflected from the detection region when the first emission device is started, and that only the second receiving device receives the light reflected from the detection region when the second emission device is started. Therefore, the problem of light crosstalk is basically resolved.

As shown in FIG. 2 and FIG. 3, the casing 100 may include an outer casing 110 and an inner casing 120; the outer casing 110 demarcates an inner chamber 200, and the outer casing 110 includes a first translucent plate 1126 and two second translucent plates 1125; and the inner casing 120 is provided in the inner chamber 200, the inner casing 120 is connected to an inner wall of the outer casing 110, and the inner casing 120 divides the inner chamber 200 into an emission chamber 210 and a receiving chamber 220. The inner casing 120 is respectively connected to two end plates 111 and an emission wall 1123, and demarcates the emission chamber 210 together with the emission wall 1123 and the two end plates 111.

The first translucent plate 1126 faces the emission chamber 210, and laser beams emitted by the first emission device 410 and the second emission device 420 pass through the first translucent plate 1126 and are directed to the outside of the LiDAR 10. The two second translucent plates 1125 both face the receiving chamber 220, the first receiving device 310 receives a laser beam passing through one of the second translucent plates 1125, and the second receiving device 320 receives a laser beam passing through the other second translucent plate 1125.

Specifically, the outer casing 110 includes two opposite end plates 111 and a side wall plate 112. The side wall plate 112 is located between the two end plates 111 and demarcates the inner chamber 200 together with the two end plates 111. The side wall plate 112 includes an emission wall 1123, a first receiving wall 1121, and a second receiving wall 1122. Along a circumferential direction of the side wall plate 112, the first receiving wall 1121 and the second receiving wall 1122 are respectively located at two ends of the emission wall 1123.

The first translucent plate 1126 is arranged on the emission wall 1123, and the first translucent plate 1126 can be a flat plate or a curved plate. This may specifically depend on a shape of the emission wall 1123. As the flat plate, the first translucent plate 1126 may be circular or polygonal. In this embodiment, the first translucent plate 1126 is a rectangular flat plate. The first translucent plate 1126 may completely cover the emission wall 1123 (in this case, the first translucent plate 1126 is the emission wall 1123) or may partially cover the emission wall 1123.

The two second translucent plates 1125 are arranged on the first receiving wall 1121 and the second receiving wall 1122 in a one-to-one correspondence manner. Similarly, the second translucent plate 1125 may be a flat plate or a curved plate. This depends on shapes of the first receiving wall 1121 and the second receiving wall 1122. As a flat plate, the second translucent plate 1125 can be circular or polygonal. In this embodiment, the second translucent plate 1125 is a rectangular flat plate.

When the emission wall 1123, the first receiving wall 1121, and the second receiving wall 1122 are all flat, the first receiving wall 1121, the second receiving wall 1122, and the emission wall 1123 may be coplanar. To reduce an overlapping area between the first receiving subregion and the second receiving subregion and increase an entire detection field of view of the LiDAR, in this embodiment, as shown in FIG. 1, FIG. 2, FIG. 8, and FIG. 9, the first receiving wall 1121 and the emission wall 1123 form a first included angle c, the second receiving wall 1122 and the emission wall 1123 form a second included angle d, and the first included angle c and the second included angle d are equal and both obtuse angles less than 180 degrees. For example, the first included angle c and the second included angle d can be 170 degrees, 150 degrees, 135 degrees, 120 degrees, or 100 degrees. It should be noted that, as described above, the first included angle c and the second included angle d are both included angles obtained by measuring the inside of the casing 100. That is, the first included angle c is an included angle between an inner wall surface of the first receiving wall 1121 and an inner wall surface of the emission wall 1123, and the second included angle d is an included angle between an inner wall surface of the second receiving wall 1122 and the inner wall surface of the emission wall 1123.

Figure 10:
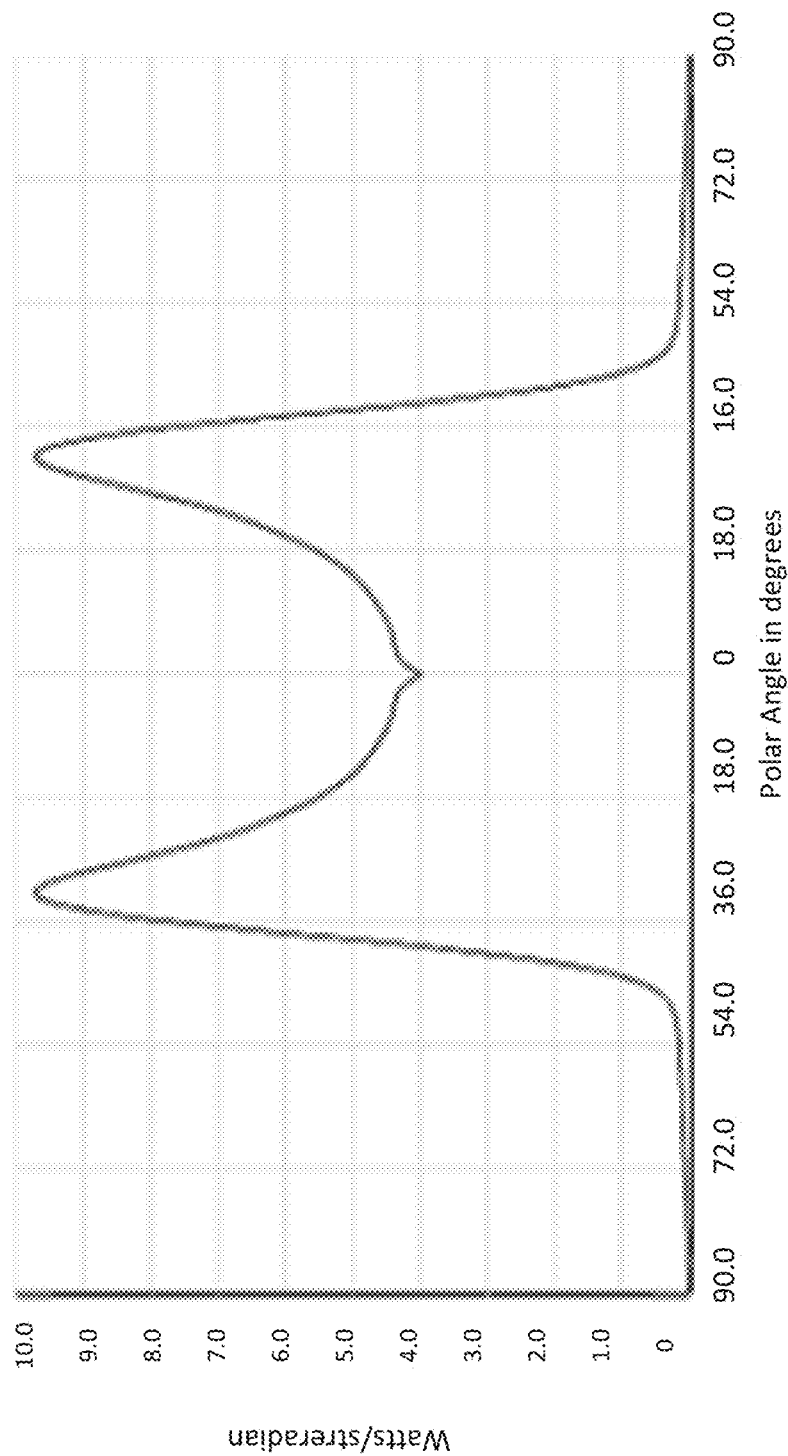
FIG. 10 is a schematic diagram of a curve of intensity of light changing with a position in an emission field of view of a laser emission device in the related art.
Figure 11:
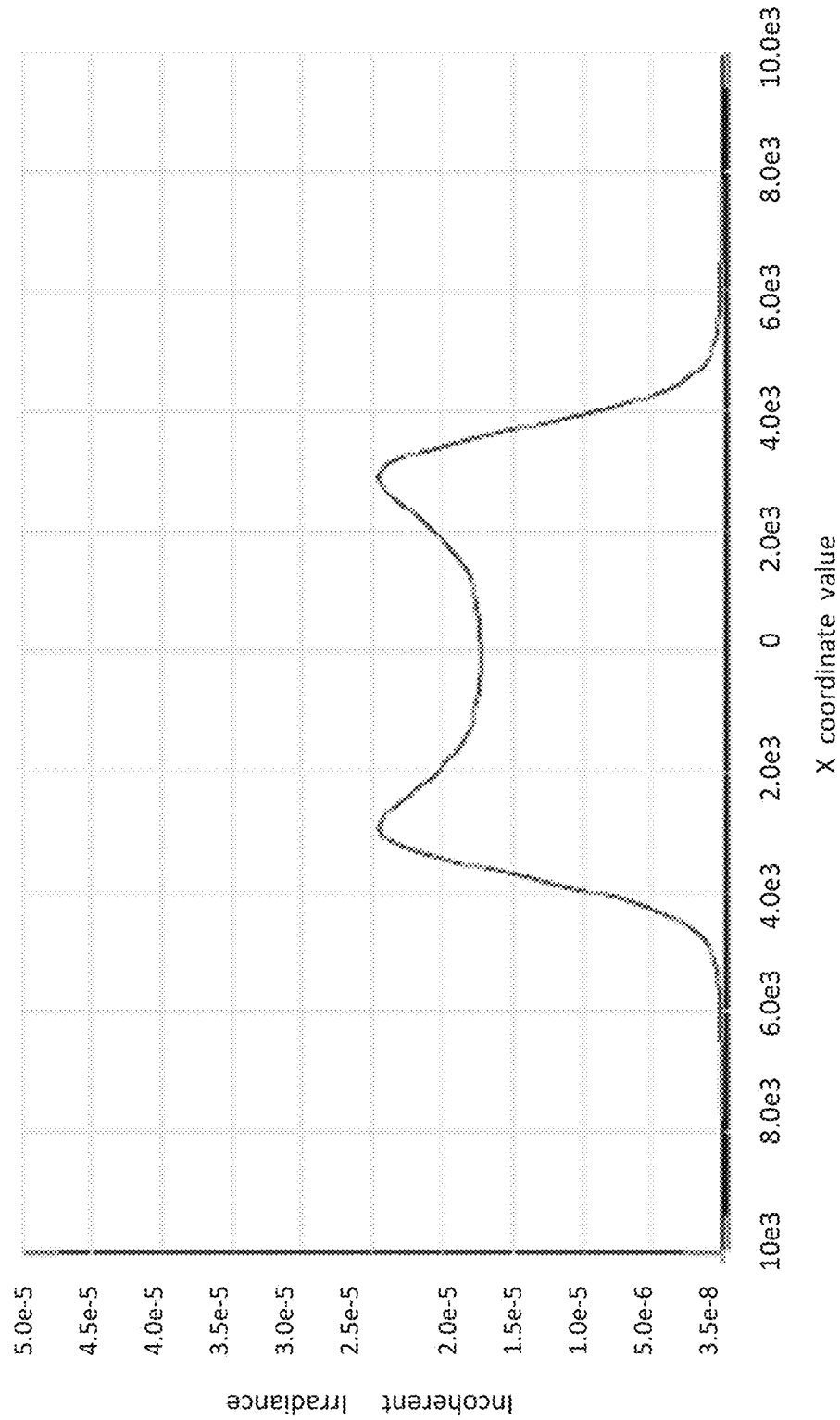
FIG. 11 is a schematic diagram of a curve of intensity of light changing with a position in an emission field of view of a laser emission device according to an embodiment of this application.

As shown in FIG. 10 and FIG. 11, due to a hardware limitation, in the related art, intensity of light emitted by the laser emission device varies at different positions in the emission field of view, and such variation affects the detection precision of the LiDAR to some extent. It can be seen from FIG. 10 that intensity of light at a center of the emission field of view is lower, and intensity of light at a position near an edge of the emission field of view is higher. To improve uniformity of light throughout the emission field of view, in an embodiment, the LiDAR may further include an optical homogenizer (namely, a micro-optical system with a specific structure (diffuser or ROE)). The optical homogenizer is configured to adjust the light emitted by the laser emission device, so that light energy is more uniformly distributed throughout the emission field of view. Outgoing light emitted by the laser emission device passes through the specific micro-optical system (diffuser or ROE) and then illuminates the field of view at a time through floodlight. In this case, the light in the emission field of view is distributed in a specific region in the space according to a specific rule. FIG. 11 is a curve chart showing that intensity of light in an emission field of view changes with positions. It can be seen that the intensity of light becomes more uniform throughout the emission field of view.

Specifically, a light source chip in the laser emission device in this embodiment may be a vertical-cavity surface-emitting laser (VCSEL) produced through a semiconductor process, and an angle of view of the outgoing light is generally 20° to 24°. A surface of the chip is covered with a micro-optical device such as a diffuser (diffraction type) or ROE (refractive type), to diffuse outgoing light and implement outgoing energy shaping and uniform emission through multiple refraction or reflection, thereby focusing more energy within a designed outgoing angle of view. The diffuser has a diffraction micro-optical structure, and usually uses a material of an organic polymer. The ROE is a refractive micro-optical element made from glass, and implements a function similar to that of the diffuser, but a principle of the ROE is based on refraction and reflection of light. Similar to a microlens array, the ROE has better high-temperature resistance and costs more. Based on a far-field energy distribution curve of the light source chip, corresponding optical lens parameters of a receiving end are designed to compensate for uneven energy distribution of an emission light source.

Figure 12:
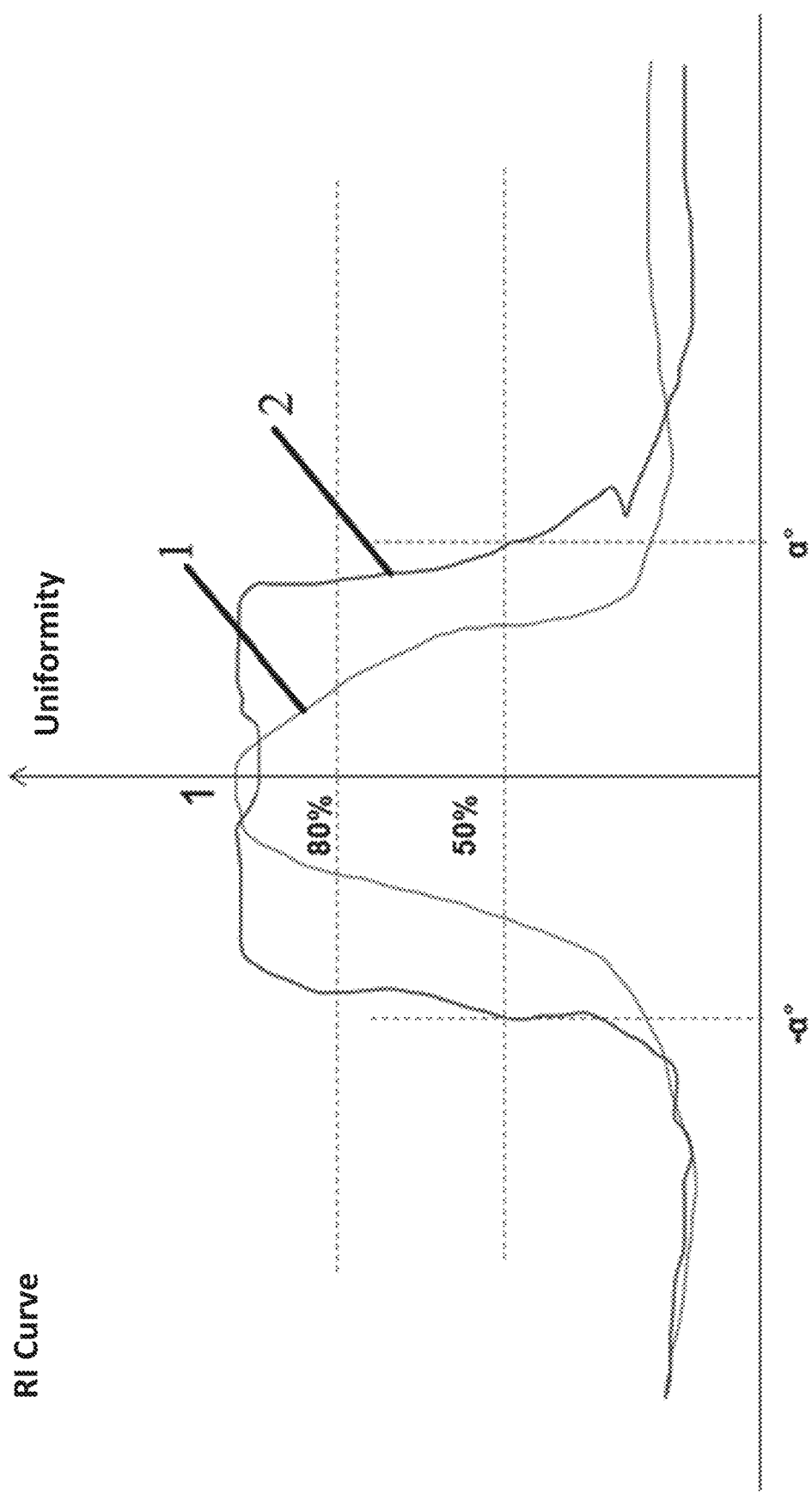
FIG. 12 is a schematic diagram of a curve of a light receiving angle changing with uniformity in the receiving field of view of the laser receiving device, where curve 1 is a schematic curve of a laser receiving device in the related art, and curve 2 is a schematic curve according to an embodiment of this application.
Figure 13:
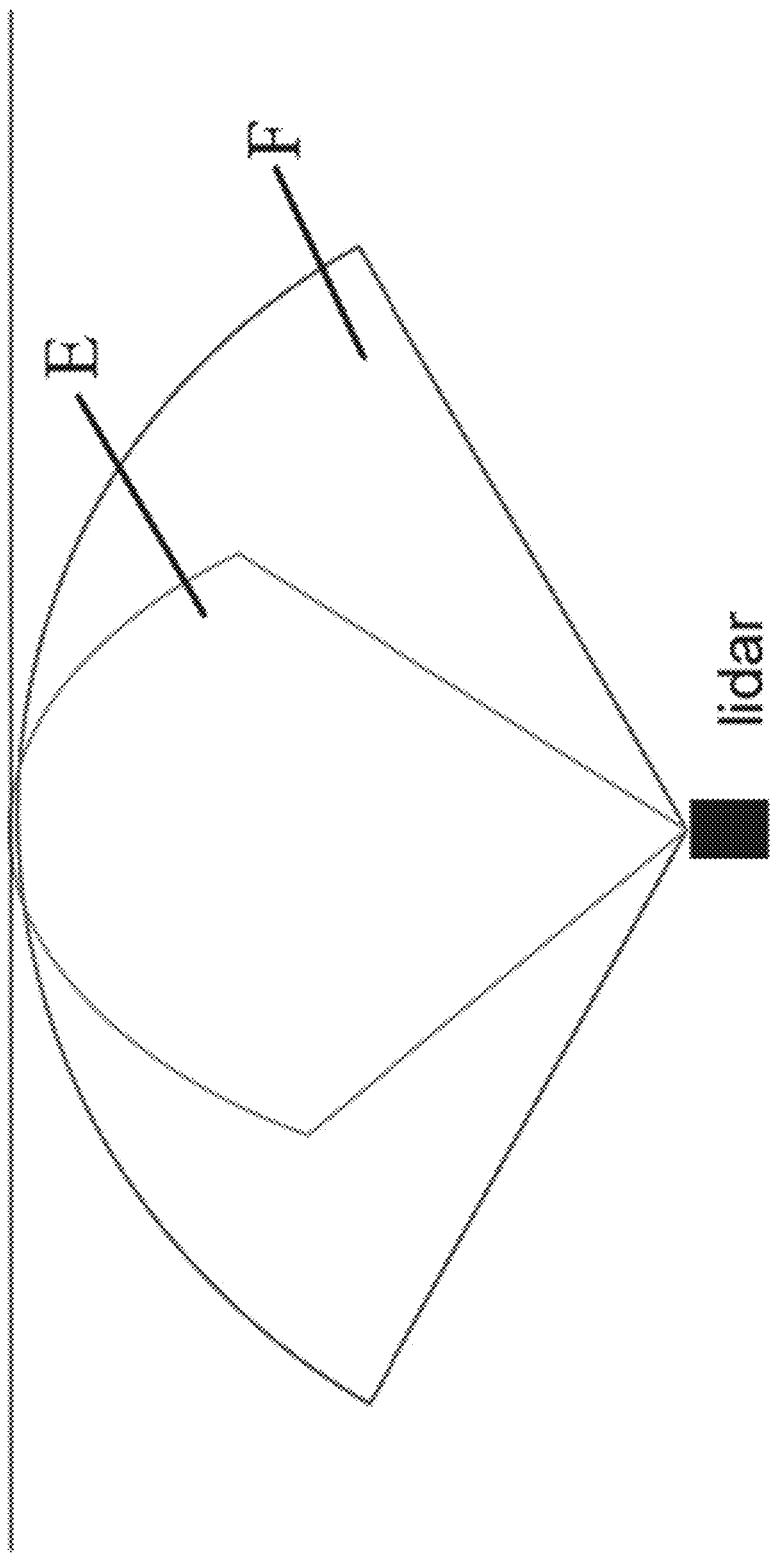
FIG. 13 is a schematic diagram of a scope of a receiving field of the laser receiving device, where a field of view E is a schematic diagram of a field of view in the related art, and a field of view F is a schematic diagram of a field of view according to an embodiment of this application.

As shown in FIG. 12 and FIG. 13, the optical lens of the receiving end usually has maximum receiving efficiency at the center, and the receiving efficiency attenuates rapidly in the peripheral region, as indicated by a curve 1 in FIG. 12. The optical lens of the receiving end with poor uniformity is used for receiving, and cooperates with the foregoing laser emission device with poor uniformity of energy distribution, and as a result, the LiDAR can detect non-uniform distances and has a small detection field of view, that is, a detection field of view E in FIG. 13, with a long detection distance in the middle and an extremely insufficient detection distance on both sides.

In an embodiment, to more uniformly perform detection, the optical lens of the receiving end of the laser receiving device may be improved accordingly. Specifically, optical lenses of the receiving end of the laser receiving device can use 6 optical lenses, including 5 spherical glass lenses and 1 aspherical glass lens (which, as compared to the spherical lens, increases a degree of freedom, has a higher-order dimension, and is equivalent to 1.5 to 2 spherical glass lenses). The plurality of lenses cooperate with each other to implement correction and effectively compensate for an aberration of a tangential surface and a sagittal surface, thereby ensuring sufficient resolution (required for a planar array radar) on the premise of sufficient light emission. Defocusing of the tangential surface and the sagittal surface causes imaging distortion. The distortion is decreased through methods of using a material with a high refractive index and optimizing an internal transmission angle of view of an optical path, and so on. Generally, TV distortion needs to be less than ~30%. Great light emission inevitably causes a large included angle between a received reflected laser beam and a central optical axis of the optical lens of the receiving end. A combination of lenses is used to switch between high and low refractive indexes, thereby improving spherical aberration. A design combining a multi-layer mirror coating with high-performance and proper LAS filter (IR785 Alexa Filter) passband is used to ensure that energy transmission efficiency of the optical lens of the receiving end reaches up to 95%. To reduce crosstalk and noise, the lens is coated to ensure that infrared transmittance of a single lens is less than 0.5%. Because high reflectivity for an infrared band still exists when conventional blackening processing such as anodizing is used, an inner surface of diaphragm inside the optical lens of the receiving end and an inner wall of a structural member are coated with a nano-coating with a temperature gradient process, to effectively improve a light absorption feature on the near-infrared band, thereby greatly reducing influence of stray light on a detection effect. Two lenses with negative dispersion and one lens with wavefront shaping are used to eliminate chromatic aberration from the system, and a symmetrical design should be used inside the lenses to improve the wavefront aberration. A combination of lenses that have high and low refractive indexes and are made of different materials is used to reduce a dispersion effect. Five groups of spherical lens and one aspherical lens cooperate with one another for iteration of a designed curved surface function of the lens, and iterative optimization of a relative illumination (RI) curve of the optical lens of the receiving end with great light emission, a high modulation transfer function (MTF), and wide bandwidth.

After the parameters of the optical lens of the receiving end of the laser receiving device are optimized, a detection field of view of the LiDAR that is formed after the laser receiving device is matched with the laser emission device is a field of view range F in FIG. 13. In FIG. 13, the LiDAR can detect a larger angle of view and more uniform distances at different angles.

Theoretically, the foregoing function can also be implemented through a combination of at least 3 glass aspherical lenses and a matched design of a higher-order Fresnel parameter. The optical lens of the receiving end is properly optimized to resolve influence of saturated expansion of high and low objects and a halo phenomenon on ranging performance in an actual working condition. A designed depth of field of the optical lens of the receiving end needs to meet a parameter requirement of the LiDAR. Generally, clear focusing and imaging can be implemented when a distance is greater than 0.5 m in the near field. This also imposes a limitation that there should actually be at least two optical lenses of the receiving end. An imaging method of the LiDAR is to receive a reflected laser beam from the detection field of view at a time, and detectors of the laser receiving devices have the same energy efficiency for receiving the reflected laser beam from each region in space.

In an embodiment, as shown in FIG. 3 and FIG. 8, the first receiving device 310 has a first optical path axis 530. The first optical path axis 530 is perpendicular to the second translucent plate 1125 intersecting with the first optical path axis. The second receiving device 320 has a second optical path axis 540. The second optical path axis 540 is perpendicular to the second translucent plate 1125 intersecting with the second optical path axis, and an included angle α between the first optical path axis 530 and the second optical path axis 540 is greater than 45 degrees. With such structure, a larger angle of view can be implemented compared with the LiDAR in the related art.

To eliminate a blind spot from the field of view of LiDAR 10, in this embodiment, as shown in FIG. 2 and FIG. 9, the first receiving device 310 has a first conical detection field. The first conical detection field has a first margin edge line m adjacent to the emission wall 1123. The second receiving device 320 has a second conical detection field. The second conical detection field has a second margin edge line n adjacent to the emission wall 1123, The first margin edge line m intersects with the second margin edge line n, and an intersection is located on a side of a surface of the emission wall 1123 facing a detected object. A minimum included angle b between the first margin edge line m and the second margin edge line n may be 1 degree. Because the LiDAR 10 has a small size, a distance between the first receiving device 310 and the second receiving device 320 is relatively small. Therefore, even if the included angle between the first margin edge line and the second margin edge line is small, a blind spot in the front field of view of the LiDAR 10 is not extremely large. For example, when the included angle b between the first margin edge line m and the second margin edge line n is 1 degree, because the distance between the first receiving device and the second receiving device is usually within 1 decimeter, if the distance is considered to be 1 decimeter, the farthest distance of the blind spot in the direct front field of view of the LiDAR is calculated to be 5.7 meters. The detection region of the LiDAR may be longer than 5.7 meters. In addition, the blind spot is narrow and long, and has little impact on detection. A detected object appearing in the blind spot usually needs to pass by a detectable region, and therefore, even if the detected object appears in the long and narrow blind spot directly in front of the LiDAR, a motion parameter of the detected object can also be obtained indirectly.

As shown in FIG. 2 to FIG. 4, the inner casing 120 may include a first plate body 121 and a second plate body 122, and both the first plate body 121 and the second plate body 122 are separately connected to an emission wall 1123 and two end plates 111. An included angle between the first plate body 121 and the second plate body 122 (that is, an included angle between the first plate body 121 and the second plate body 122 that faces the emission chamber 210 herein) is an obtuse angle. The first emission device 410 is arranged on a surface of the first plate body 121 that faces the emission chamber 210, and the second emission device 420 is arranged on a surface of the second plate body 122 that faces the emission chamber 210. After the first emission device 410 and the second emission device 420 are completely mounted, a central axis 510 of a laser beam emitted by the first emission device 410 can be made to be perpendicular to the first plate body 121, and a central axis 520 of a laser beam emitted by the second emission device 420 can be made to be perpendicular to the second plate body 122. In this way, when a shape of the inner casing 120 is designed, an included angle between the first plate body 121 and the second plate body 122 can be adjusted, to control a final emission field of view of the first emission device 410 and the second emission device 420, thereby reducing a design difficulty.

The inner casing 120 may only include the first plate body 121 and the second plate body 122, and the first plate body 121 and the second plate body 122 are integrated. In addition, the first plate body 121 and the second plate body 122 may also be plate bodies of the inner casing 120 that are used only for mounting the first emission device 410 and the second emission device 420, and the inner casing 120 also has another part.

To improve heat dissipation efficiency, in this embodiment, the inner casing 120 and a side wall plate 112 are integrated, and further, the inner casing 120, the side wall plate 112, and one end plate 111 may be integrated. With such structure, heat conduction efficiency of the two emission devices can be increased, thereby improving heat dissipation performance of the LiDAR 10. In an embodiment, for better heat dissipation, a plurality of heat dissipation grooves 1124 may be arranged on an outer wall surface of the side wall plate 112; and a plurality of heat dissipation ribs 1128 may be further arranged on an inner wall surface of the side wall plate 112. Specifically, the heat dissipation grooves 1124 can be blind grooves or through grooves, and each heat dissipation groove 1124 can be arranged at any part of the side wall plate 112 other than the first translucent plate 1126 and the second translucent plate 1125.

In an embodiment, a first mounting groove 1211 is arranged on a surface of the first plate body 121 that faces the first emission device 410, and the first emission device 410 is embedded in the first mounting groove 1211. A second mounting groove is arranged on a surface of the second plate body 122 that faces the second emission device 420, and the second emission device 420 is embedded in the second mounting groove. With such structure, the two emission devices are more stably mounted, and a contact area between the inner casing 120 and the two emission devices can also be increased, thereby improving heat dissipation performance. Further, a first heat conduction member may be further arranged in the first mounting groove 1211, and the first heat conduction member is connected to the first mounting groove 1211 and the first emission device 410. A second heat conduction member is arranged in the second mounting groove, and the second heat conduction member is connected to the second mounting groove and the second emission device 420. The first heat conduction member and the second heat conduction member may be made of any material with good heat conduction performance. In addition, the first heat conduction member and the second heat conduction member may also be made from a material with buffering performance. For example, the first heat conduction member and the second heat conduction member may both be thermally conductive silicone.

A shape of the first heat conduction groove depends on a shape of the first emission device 410. In this embodiment, a surface of the first emission device 410 that faces the first plate body 121 is rectangular, and therefore, the first heat conduction groove is a trough with a rectangular cross-section. In this case, the first heat conduction member can be in a shape of a rectangular sheet and is placed on the bottom of the first heat conduction groove. The first heat conduction member can also be annular and located between an outer peripheral edge of the first emission device 410 and a side wall of the first heat conduction groove. Certainly, the first emission device 410, the first heat conduction groove, and the first heat conduction member may also be of another shape. Details are described herein again.

Figure 14:
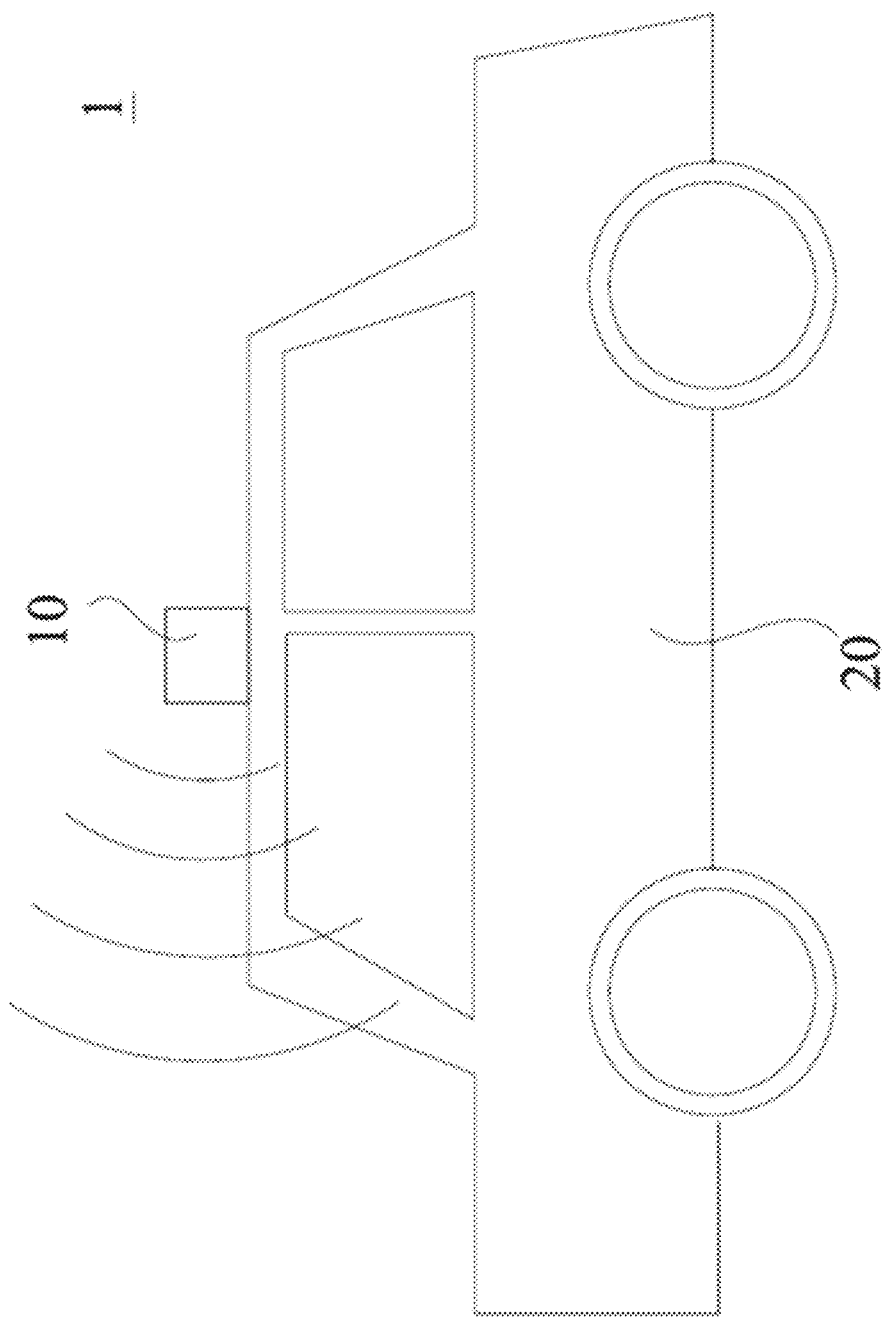
FIG. 14 is a schematic diagram of a device according to an embodiment of this application.
Figure 15:
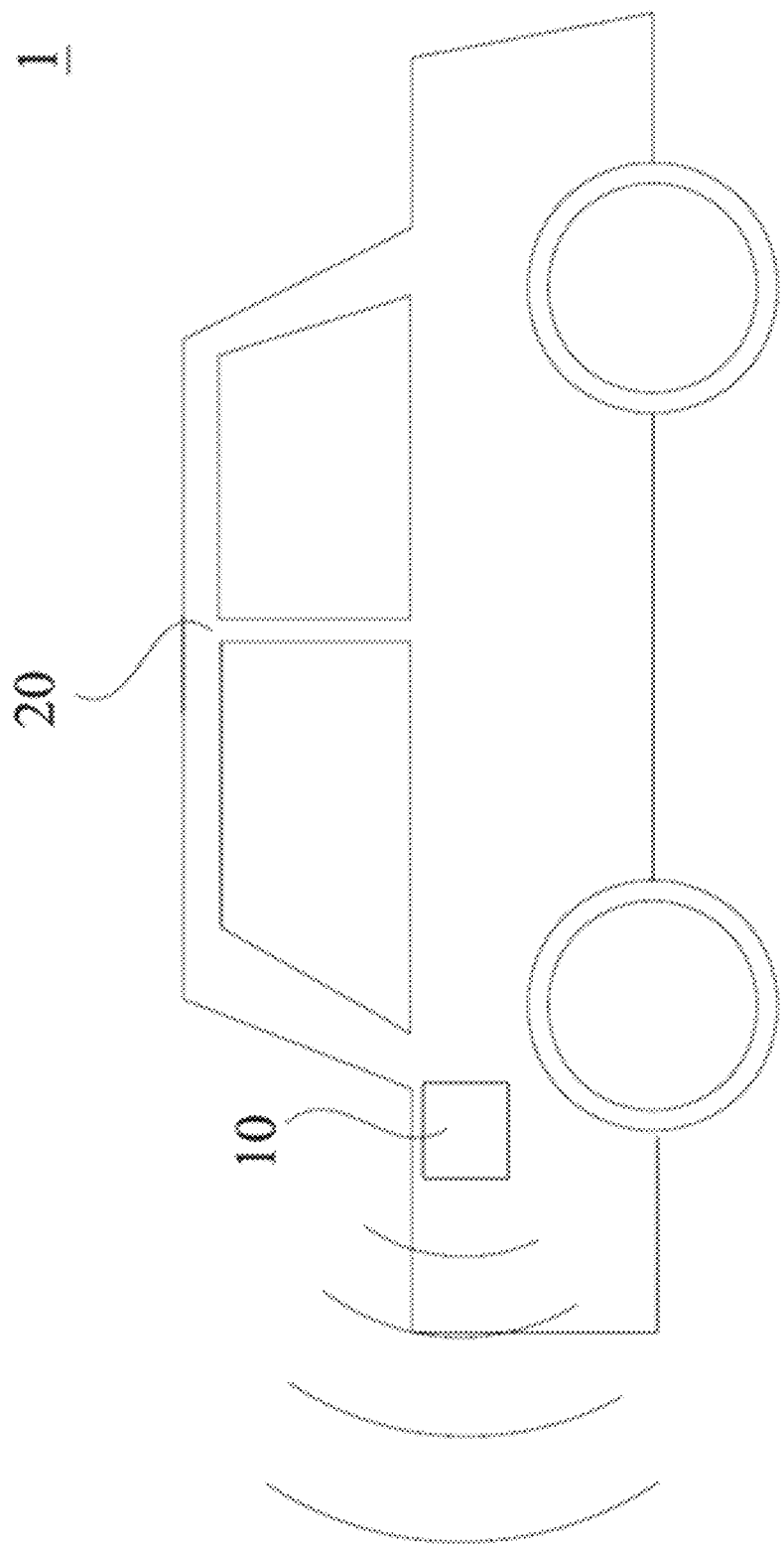
FIG. 15 is a schematic diagram of a device according to another embodiment of this application.

As shown in FIG. 14 and FIG. 15, a second aspect of the embodiments of this application further provides a device 1, where the device 1 includes the LiDAR 10 in any one of the foregoing embodiments. The device 1 can be any device capable of laser detection, and specifically, the device can be a vehicle. The vehicle includes a vehicle body 20, and the LiDAR 10 can be mounted outside the vehicle body 20 or embedded in the vehicle body 20. When the LiDAR 10 is arranged outside the vehicle body 20, the LiDAR 10 is preferably arranged on the top of the vehicle body 20.

In another feasible embodiment, this application provides another solution for reducing a blind spot by overlapping an emission detection region and a receiving detection region.

As shown in FIG. 16, for an off-axis optical system in the related art, an emission angle of view of an emission module 700 on a right side corresponds to a receiving angle of view of a receiving module 600 on a left side, and as a detection distance gets shorter, there is no light in a central field of view, and correspondingly, there is no point cloud in a central field of view of the receiving module 600. For the off-axis optical system in the related art, in a case of a short distance, there is no light in a central field of view of the target, and therefore, the central field of view of the receiving module 600 includes no point cloud, and is blank. The shorter the detection distance, the larger the region without point cloud in the central field of view of the receiving module 600. However, for the LiDAR, the central field of view is more crucial, and there is no point cloud in the central field of view at the close distance, which cannot meet a requirement. If fields of view of a plurality of LiDARs are spliced, no point cloud is displayed in the center at the short distance after splicing.

Referring to FIG. 17 to FIG. 23, in an embodiment of the present invention, a LiDAR is provided. The LiDAR in this embodiment may be a solid-state LiDAR, which is used for functions (such as navigation, obstacle avoidance, obstacle recognition, ranging, speed measurement, and automated driving) of products (such as an automobile, a robot, a transport vehicle, and a patrol vehicle).

The LiDAR includes one receiving module 600 and a plurality of emission modules 700. The receiving module 600 is configured to receive an echo signal. The emission module 700 is configured to emit a detection laser beam. A combination of emission fields of view of the plurality of emission modules 700 matches a receiving field of view of the receiving module 600, that is, a combined angle of view of the emission fields of view of the plurality of emission modules 700 is greater than or equal to that of the receiving field of view of the receiving module 600.

It can be understood that "a plurality of" refers to "two or more"; when there are two emission modules 700, the two emission modules 700 are respectively arranged on two sides of the receiving module 600; and when there are three or more emission modules 700, the plurality of emission modules 700 are arranged around the receiving module 600.

More specifically, emission angles of view of the plurality of emission modules 700 may be equal or unequal. In general, a sum of the emission angles of view of the plurality of emission modules 700 only needs to be equal to a receiving angle of view of the receiving module 600. For example, suppose there are two emission modules 700 and their emission angles of view are the same. Herein, α1=α2, and α1+α2=α3, where α1 is an emission angle of view of one of the emission modules 700, α2 is an emission angle of view of the other emission module 700, and α3 is a receiving angle of view of the receiving module 600. However, occasionally, there is a lack of point cloud in an edge field of view in use. Therefore, during design, the sum of the emission angles of view of the plurality of emission modules 700 can also be set to be greater than the receiving angle of view of the receiving module 600, so that there is a point cloud in the edge field of view of the LiDAR.

The plurality of emission modules 700 in this embodiment may have the same or different structures. When the plurality of emission modules 700 have the same structure, in comparison with the plurality of emission modules 700 having different structures, because the plurality of emission modules 700 have the same parameter, operations such as assembling and positioning are more convenient to perform. When the structures of the plurality of emission modules 700 are not all identical, various combinations of the plurality of emission modules 700 may be implemented, which can cater to more use scenarios. In addition, the use of the plurality of emission modules 700 can reduce a volume of an emission chip used for each emission module 700, so that power and costs of a single emission module 700 can be effectively reduced and related hardware driver can be further easier to operate. In addition, a position and a light-emission effect of the single emission module 700 are also easy to adjust, to more easily ensure that light emitted by the plurality of emission modules 700 is evenly distributed.

The receiving module 600 has a first optical axis 640. The emission module 700 includes an emission optical component 710 and a laser 720. The laser 720 is located on a light-incident side of the emission optical component 710, and is configured to emit a laser beam to the emission optical component 710, and an area of a projection region of a light emission region of the laser 720 on a light-incident face of the emission optical component 710 is smaller than an area of the light-incident face, so that the laser beam emitted by the laser 720 can be directed to the emission optical component 710. Specifically, the laser 720 may include a plurality of independently arranged light emitters, or one circuit board and a plurality of light emitters electrically connected to the circuit board. Herein, the light emission region of the laser 720 is a combined region of a light-emission portion of the light emitter. The light emitter may be the emission chip, or an assembly of the emission chip and a corresponding driver device.

In this embodiment, the laser 720 and the emission optical component 710 may have various position relationships. For example, a center of the light emission region of the laser 720 is located on a side of a second optical axis 711 away from the receiving module 600, or a side close to the receiving module 600, or is located on the second optical axis 711. This may specifically depend on factors such as a specific structure of the emission optical component 710, a light-emission effect, and an echo signal receiving effect, and is not exclusively limited herein. Specifically, the laser 720 in this embodiment generally includes a plurality of light emitters arranged in an array or according to another rule. Herein, the center of the light emission region refers to a center of a regular pattern formed by combining the plurality of light emitters. For example, when the plurality of light emitters are arranged in a two-dimensional rectangular array, the center of the light emission region is an intersection of two diagonal lines in the rectangle; or when distributed in a circular array, the plurality of light emitters overall form a circle, and then the center of the light emission region is a center of the circle. The center of the foregoing light emission region is located on a side of the second optical axis 711 away from the receiving module 600 or the side close to the receiving module 600. The entire light emission region may be located on the side of the second optical axis 711 away from the receiving module 600 or the side close to the receiving module 600. Alternatively, more than a half of the light emission region may be located on the side of the second optical axis 711 away from the receiving module 600 or the side close to the receiving module 600. Specifically, this can be selected based on a detection need, and is not exclusively limited herein.

In an exemplary solution, when there are two emission modules 700, an emission angle of view θE of the emission module 700 may satisfy 0<θE≤90°. Specifically, based on an actual need, the quantity of light emission units in the laser 720 or deflection processing of light that is performed by the emission optical component 710 may be designed, to obtain the needed emission angle of view; and a receiving angle of view OR of the receiving module 600 may satisfy 0<θR≤180°. Specifically, the receiving optical component 610 may be designed based on the actual need.

When the laser 720 includes the emission chip, the entire light emission region is located on the side of the optical axis of the emission optical component 710 away from the receiving module 600. Specifically, an emission chip corresponding to an emission module 700 on the left side is arranged on the left side of an optical axis of a corresponding emission optical component 710, and an emission chip corresponding to an emission module 700 on the right side is arranged on the right side of an optical axis of a corresponding emission optical component 710. The entire light emission region is located on the side of the optical axis of the emission optical component 710 close to the receiving module 600. Specifically, the emission chip corresponding to the emission module 700 on the left side is arranged on the right side of an optical axis of a corresponding emission optical component 710, and an emission chip corresponding to an emission module 700 on the right side is arranged on the left side of an optical axis of a corresponding emission optical component 710.

The emission optical component 710 has a second optical axis 711 and is configured to collimate a laser beam, expand the laser beam, and direct at least some laser beams to be emitted toward the side on which the first optical axis 640 is located, so that the emission fields of view of the plurality of emission modules 700 have an overlapped region. The emission optical component 710 in this embodiment may include one or more lenses, and in addition to the lenses, the emission optical component may also include another optical component that can cooperate with the lenses to implement the foregoing effects, such as an optical homogenizer or a prism, provided that the foregoing effects can be realized. This is not exclusively limited herein.

A detection principle of the LiDAR provided in this embodiment of the present invention is as follows.

The laser 720 emits the laser beam. Then the laser beam is collimated and expanded, and its transmission direction is changed by the emission optical component 710. Then the laser beam is emitted toward the target and then reflected by the target to form an echo signal. The echo signal is received and processed by the receiving module 600, to obtain information such as a distance and an external shape of the target.

In the foregoing process, when the laser beam passes through the emission optical component 710, an original transmission direction of at least a part of the laser beam can be changed by the emission optical component 710, so that emission angles of view of the plurality of emission modules 700 are overlapped. The overlapped region covers a central field of view, so that there is still a laser beam being emitted in the central field of view when the LiDAR performs short-distance detection even if there is pixel shifting, to ensure that there is the point cloud in the central field of view of the receiving module 600, thereby effectively avoiding the lack of point cloud in the central field of view of the receiving module.

In an optional embodiment, the original transmission direction of at least the part of the laser beam can be changed by the emission optical component 710, to be emitted toward the side on which the first optical axis 640 of the receiving module 600 is located, so that laser beams emitted by a plurality of emission optical elements are intersected when being emitted, rather than that all the laser beams are emitted outward in the related art, to ensure that the laser beams emitted by the plurality of emission modules 700 have an overlapped region in a central region of the target, that is, there is a light spot in the central region of the target, thereby ensuring that there is a point cloud in the central field of view of the receiving module 600.

In addition, because emission angles of view of the emission modules 700 remain unchanged, the target is at a shorter distance. That is, the shorter the detection distance, the larger the angle of reflecting the laser beam by the target, so that a light spot of an echo signal reaching a receiving face of the receiving module 600 shifts toward the center, thereby resolving the problem of the lack of point cloud in the short-distance central field of view. It should be noted that the short distance also falls within a specific range. When the distance is shorter than the minimum critical distance, the lack of point cloud in the central field of view still occurs.

The LiDAR provided in this embodiment of the present application includes a receiving module 600 and a plurality of emission modules 700. The plurality of emission modules 700 are arranged around the receiving module 600, a combination of emission fields of view of the plurality of emission modules 700 matches the receiving field of view of the receiving module 600, and therefore, a size of the laser 720 used for the single emission module 700 can be reduced, so that power and costs of the single emission module 700 can be effectively reduced and related hardware driver can be further easier to operate. In addition, a position and a light-emission effect of the single emission module 700 are also easy to adjust, to more easily ensure that light emitted by the plurality of emission modules 700 is evenly distributed.

In addition, the emission module 700 includes an emission optical component 710 and a laser 720. An area of a projection region of the laser 720 on a light-incident face of the emission optical component 710 is smaller than an area of the light-incident face of the emission optical component 710. A center of the light emission region is located on a side of a second optical axis 711 away from the receiving module 600 or the side close to the receiving module 600. The emission optical component 710 has a second optical axis 711 and is configured to collimate a laser beam, expand the laser beam, and direct at least some laser beams to be emitted toward the side on which the first optical axis 640 is located, so that the emission fields of view of the plurality of emission modules 700 are overlapped. With such structure, the size of the laser 720 used for the single emission module 700 can be further reduced, and an inherent mode is also changed in which all laser beams emitted by the small-sized laser 720 in the ordinary LiDAR are directed toward a direction away from the first optical axis 640. An outgoing direction of at least some laser beams emitted by the laser 720 is set as a direction facing the side on which the first optical axis 640 is located, so that emission fields of view of the plurality of emission modules 700 are overlapped. The overlapped region covers a central field of view, so that there is still a laser beam being emitted in the central region of the target when the LiDAR performs short-distance detection even if there is pixel shifting, to ensure that there is a point cloud in the central field of view of the receiving module 600, thereby effectively avoiding the lack of point cloud in the central field of view of the receiving module 600.

In conclusion, the LiDAR provided in this embodiment of the present invention is used, which can further avoid the lack of point cloud in the central field of view of the receiving module 600 while ensuring the small size of the single laser 720.

Referring to FIG. 17 to FIG. 24, in a specific embodiment, the LiDAR includes two emission modules 700. The two emission modules 700 are respectively arranged on opposite sides of the receiving module 600, and therefore, emission fields of view of the two emission modules 700 can be roughly distributed on both sides of the receiving module 600, so that it is convenient for the receiving module 600 to receive a laser beam. In addition, the emission fields of view of the two emission modules 700 are roughly distributed on the both sides of the receiving module 600, and it is also convenient to adjust at least one emission module 700, so that the emission fields of view of the two emission modules 700 are overlapped in the central field of view, to ensure that the emission fields of view cover the entire receiving field of view of the receiving module 600, thereby avoiding a detection blind spot.

In the foregoing embodiments, there may be various implementations of the emission module 700. For ease of understanding, an example is now used for description.

Figure 17:
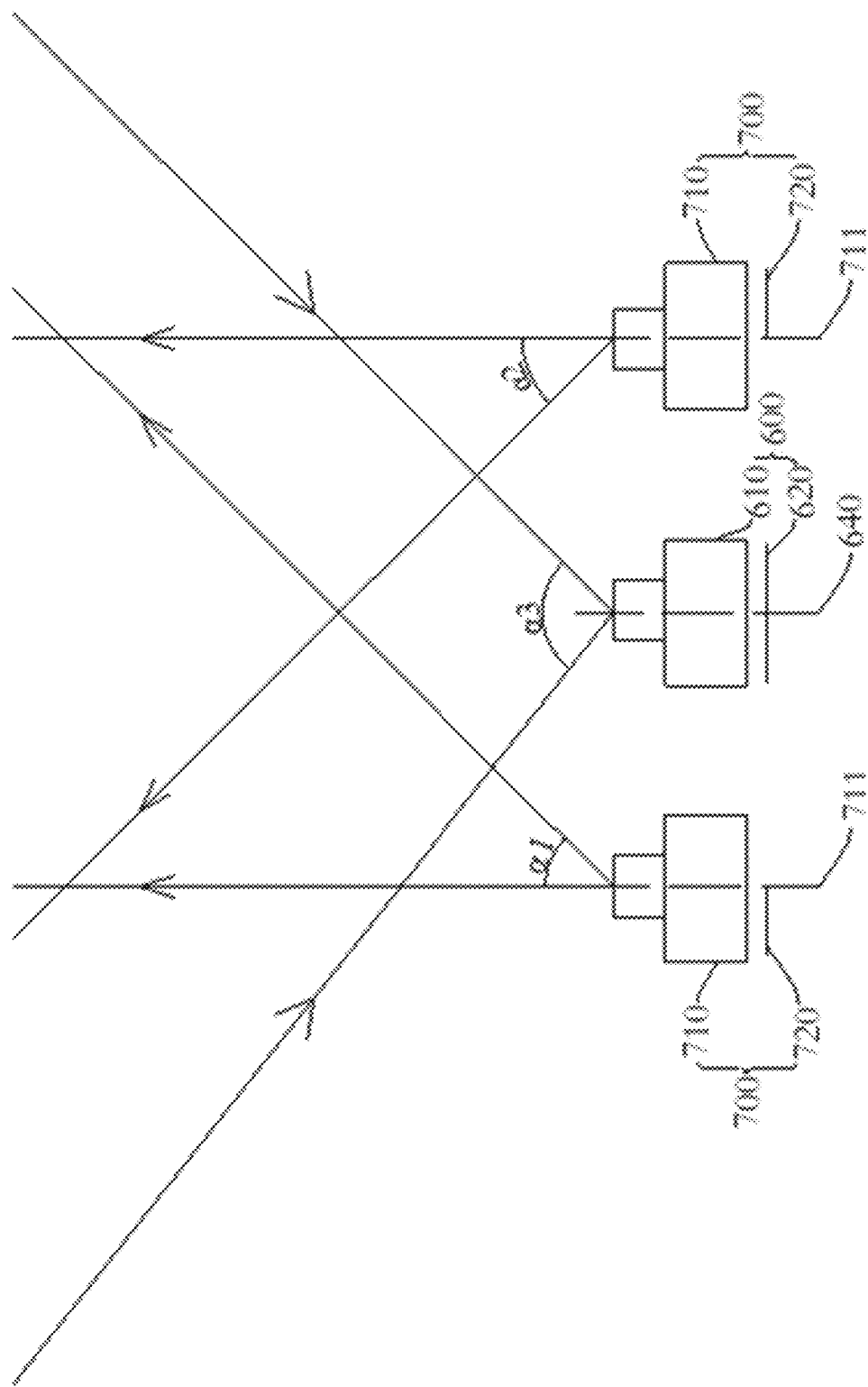
FIG. 17 is a schematic diagram of an optical path of a LiDAR according to an embodiment of this application.
Figure 18:
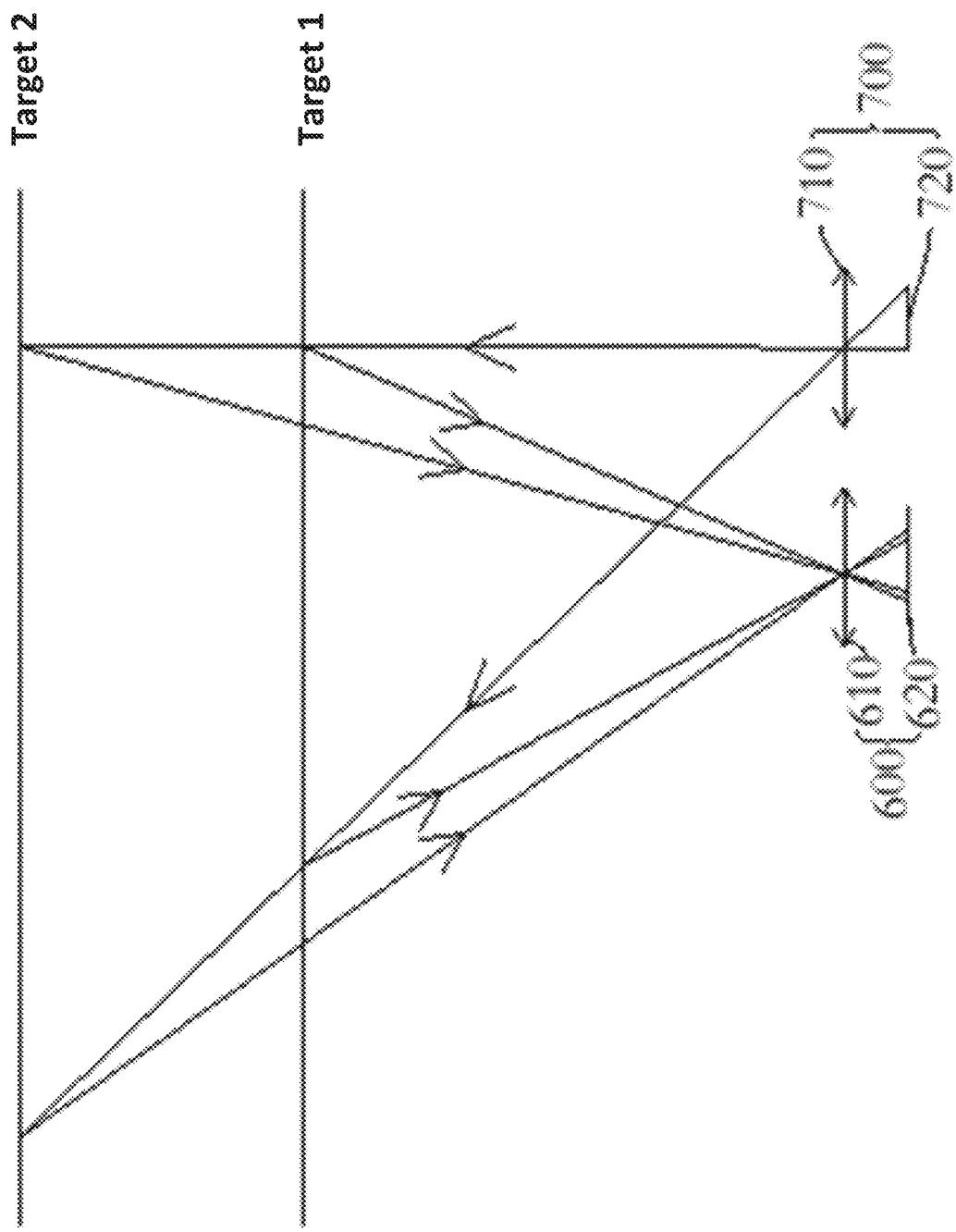
FIG. 18 is a diagram illustrating comparison of optical paths of detecting targets at different detection distances by the receiving module and one emission module in FIG. 17.
Figure 19B:
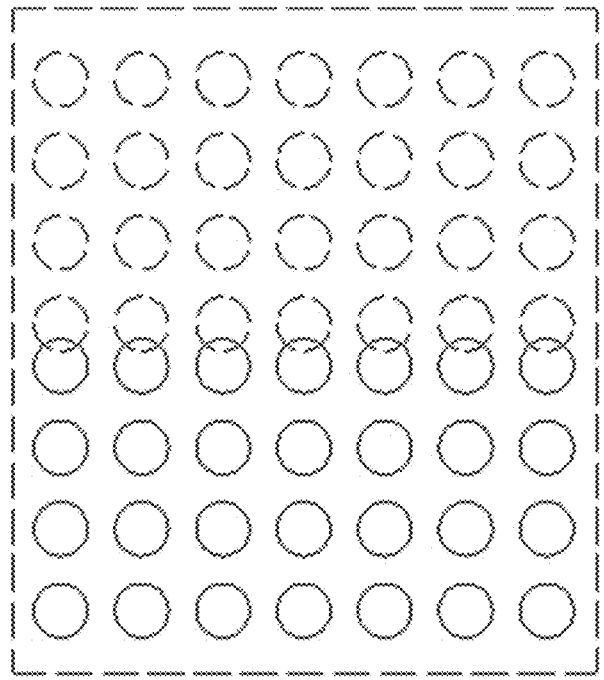
FIG. 19B is a schematic diagram of light spots received by a receiving module when target 2 is detected in FIG. 18, where a solid-line circle in the figure corresponds to a light spot emitted by one emission module, and a dotted circle in the figure corresponds to a light spot emitted by another emission module.
Figure 19A:
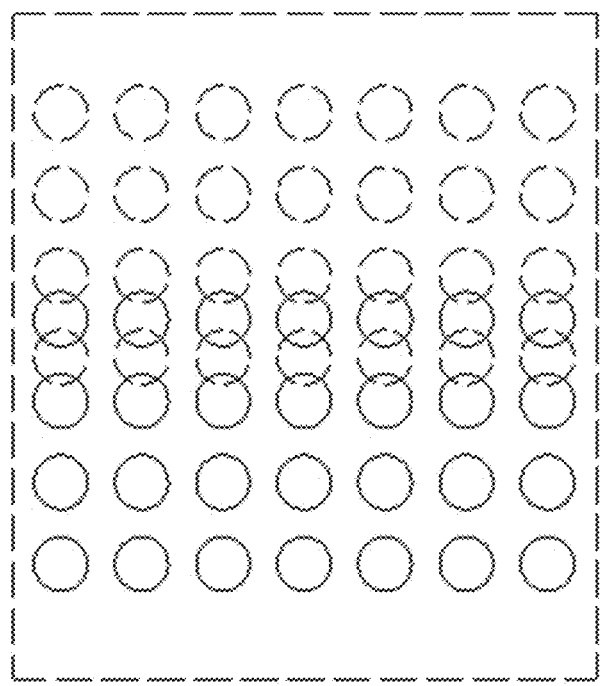
FIG. 19A is a schematic diagram of light spots received by a receiving module when target 1 is detected in FIG. 18, where a solid-line circle in the figure corresponds to a light spot emitted by one emission module, and a dotted circle in the figure corresponds to a light spot emitted by another emission module.

As shown in FIG. 17, a first implementation is as follows.

Centers of light emission regions of the lasers 720 of the plurality of emission modules 700 are located on a side of the second optical axis 711 away from the receiving module 600. The entire light emission region may be located on the side of the second optical axis 711 away from the receiving module 600. Alternatively, more than a half of the light emission region may be located on the side of the second optical axis 711 away from the receiving module 600.

The emission optical component 710 includes an angle reducing component and a beam expanding component arranged along an emission optical path of the laser. The angle reducing component includes at least one lens, and the angle reducing component is configured to reduce a divergence angle of the laser beam, direct the laser beam toward the side on which the first optical axis 640 is located, and collimate the laser beam for emission. The beam expanding component includes at least one lens, and the beam expanding component is configured to expand a total emission angle of view of the laser beam collimated by the angle reducing component.

Specifically, in this embodiment, the laser 720 is located on an object focal plane of the angle reducing component, and the angle reducing component collimates the laser beam output by the laser 720; and the beam expanding component deflects light for an optical signal collimated by the angle reducing component, to expand the angle of view of the optical signal directed to a detection region. Both the angle reducing component and the beam expanding component in this embodiment may include one or more lenses, and may also include an optical component (such as a plane mirror or a prism) that can implement a corresponding optical effect in addition to the lenses. In some embodiments, the angle reducing component uses a collimating lens, and the beam expanding component uses a beam expanding lens.

In this embodiment, more than half of the light emission region is located on the side of the second optical axis 711 away from the receiving module 600. That is, more than half of the light emission region of the laser 720 corresponding to the emission module 700 on the left side is arranged on the left side of the corresponding second optical axis 711, and more than half of the light emission region of the laser 720 corresponding to the emission module 700 on the right side is arranged on the right side of the corresponding second optical axis 711, so that most light emitted by each emission module 700 (except light parallel to the second optical axis 711) can be emitted toward a direction of the first optical axis 640, rather than that all light is emitted in the direction away from the first optical axis 640 in the related art.

Preferably, the lasers 720 of the plurality of emission modules 700 are located on the side of the second optical axis 711 of the corresponding emission optical element 210 away from the first optical axis 640. The emission module 700 uses such structure, and therefore, has a simple structure. Except for light parallel to the second optical axis 711 in light emitted by the emission module 700, other light can be emitted toward another emission module 700. The light emitted by the plurality of emission modules 700 all shifts in a direction toward the central field of view from a long detection distance to a short detection distance, which can further effectively avoid the lack of point cloud in the central field of view of the receiving module 600, thereby realizing a good effect.

In a second implementation, taking two emission modules 700 as an example, a center of a light emission region of a laser 720 of an emission module 700 is located on a side of a second optical axis 711 of a corresponding emission optical component 710 away from the receiving module 600, and a center of a light emission region of a laser of another emission module 700 is located on a side of a second optical axis 711 of a corresponding emission optical component 710 close to the receiving module 600. Herein, when the center of the light emission region is located on the side of the second optical axis 711 away from the receiving module 600, the entire light emission region may be located on the side of the second optical axis 711 away from the receiving module 600, or more than half of the light emission region may be located on the side of the second optical axis 711 away from the receiving module 600. When the center of the light emission region is located on the side of the second optical axis 711 close to the receiving module 600, the entire light emission region may be located on the side of the second optical axis 711 close to the receiving module 600, or more than half of the light emission region may be located on the side of the second optical axis 711 close to the receiving module 600.

In this embodiment, in the plurality of emission modules 700, at least a part of a laser beam emitted by the emission module 700 whose light emission region has a center located on the side of the second optical axis 711 away from the receiving module 600 is emitted toward the side on which the first optical axis is located. For this part of the laser beam (denoted as a first laser beam), pixels shift in a direction toward the central field of view from a short detection distance to a long detection distance. Alternatively, in the plurality of emission modules 700, at least a part of a laser beam emitted by the emission module 700 whose light emission region has a center located on the side of the second optical axis 711 close to the receiving module 600 is emitted in a direction away from the first optical axis. For this part of the laser beam (denoted as a second laser beam), pixels shift in a direction away from the central field of view from a long detection distance to a short detection distance. At a same detection distance, provided that shifting of the pixels of the first laser beam in the direction toward the central field of view is greater than or equal to shifting of the pixels of the second laser beam in the direction away from the central field of view, the lack of point cloud in the central field of view of the receiving module 600 can be effectively avoided.

Specifically, in this embodiment, the laser 720 is located at the object focal plane of the angle reducing component, and structures of the angle reducing component and the beam expanding component may be the same as or different from those in the first implementation, provided that the foregoing effects can be realized. In this embodiment, a diffuser or other types of optical homogenizers that can implement the foregoing effects may be used as an optical homogenizer 716.

In this embodiment, more than half of the light emission region is located on the side of the second optical axis 711 close to the receiving module 600. That is, more than half of the light emission region of the laser 720 corresponding to the emission module 700 on the left side is arranged on the left side of the corresponding second optical axis 711, and more than half of the light emission region of the laser 720 corresponding to the emission module 700 on the right side is arranged on the right side of the corresponding second optical axis 711, so that at least a part of light emitted by each emission module 700 (except light parallel to the second optical axis 711) can be emitted toward a direction of the first optical axis 640, rather than that all light is emitted in the direction away from the first optical axis 640.

In this manner, the light emitted by the laser 720 is transmitted in a direction away from the second optical axis 711 or in a direction parallel to the second optical axis 711 after passing through the emission optical device 710. However, after passing through the optical homogenizer 716, a part of the light is emitted toward another emission module 700, which can also avoid the lack of point cloud in the central field of view of the receiving module 600.

Figure 23:
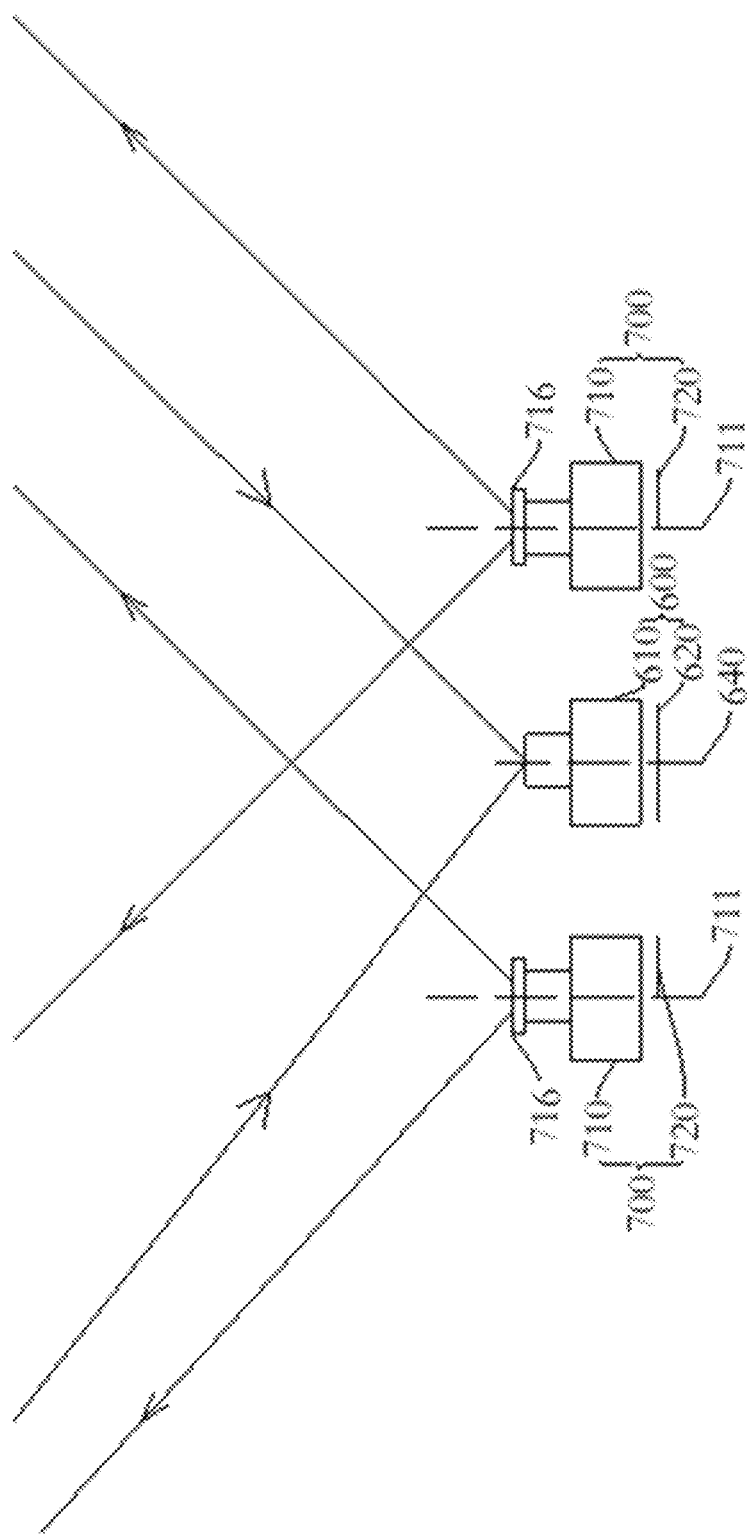
FIG. 23 is a schematic diagram of an optical path of a LiDAR according to another embodiment of this application.

As shown in FIG. 23, a third implementation is as follows.

A center of a light emission region is located on the side of the second optical axis 711 close to the receiving module 600. The emission optical component 710 includes an angle reducing component, a beam expanding component, and the optical homogenizer 716 arranged along an emission optical path of a laser beam. The angle reducing component includes at least one lens, and the angle reducing component is configured to reduce a divergence angle of the laser beam. The beam expanding component includes at least one lens, and is configured to expand a total emission angle of view of the laser beam collimated by the angle reducing component. The optical homogenizer 716 is configured to expand a light spot of a laser beam expanded by the beam expanding component, so that the emission angles of view of the plurality of emission modules 700 are overlapped.

Specifically, in this embodiment, a light source component 720 is located at the object focal plane of the angle reducing assembly, and structures of the angle reducing assembly and the beam expanding assembly may be the same as or different from those in the first implementation, provided that the foregoing effects can be realized. In this embodiment, a diffuser (Diffuser) or other optical homogenizers that can implement the foregoing effects may be used as the optical homogenizer 716.

Certainly, implementations of the emission module 700 are not limited to the foregoing two implementations, and another structure may also be used in another embodiment, which may be flexibly selected based on a use need. This is not exclusively limited herein.

When the foregoing first implementation is used, although the central field of view is compensated for the point cloud, the lack of point cloud occurs in an edge field of view when some distances are measured. To further resolve the problem, as shown in FIG. 17, and FIG. 20 to FIG. 25, in an optional embodiment, the LiDAR further includes blind spot compensation light sources 800 in a one-to-one correspondence with a plurality of lasers 720, and a blind spot compensation light source 800 is located on the side of its corresponding laser 720 away from the receiving module 600. At least a part of the light emitted by the blind spot compensation light source 800 is located outside the light emitted by the corresponding laser 720. Specifically, the blind spot compensation light source 800 in this embodiment may be a laser emission device that is the same as or different from the laser 720. This is not exclusively limited herein. Information such as a size of a light emission region of the blind spot compensation light source 800, a model, and a distance from the corresponding laser 720 may be determined based on how a lack of an edge region of a receiving field of view is. This is not exclusively limited herein. During use, the light emitted by the blind spot compensation light source 800 can be directed to an edge region of the target, so that there is the point cloud in the edge field of view of the receiving module 600.

Figure 20:
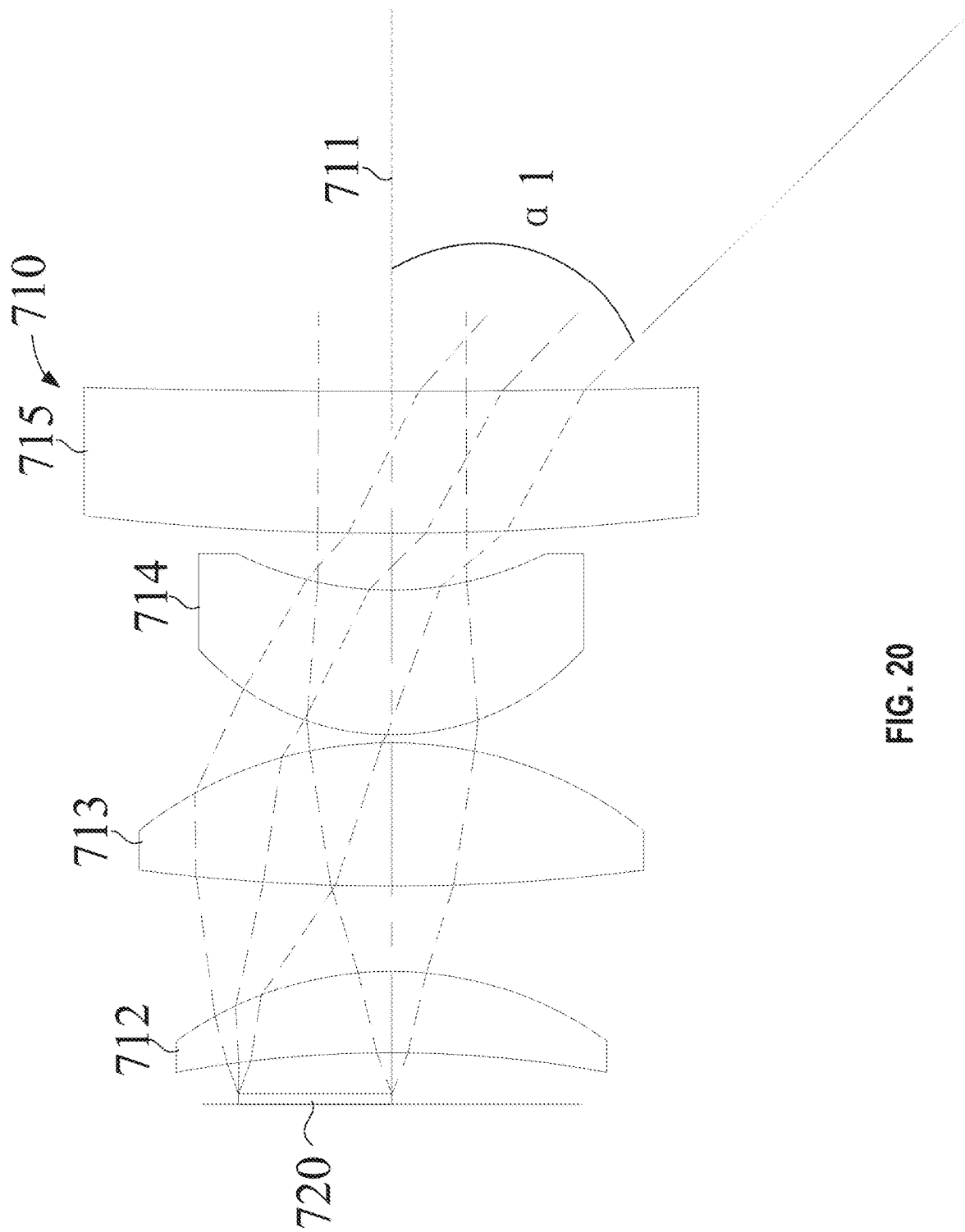
FIG. 20 is a schematic structural diagram of an emission module used in FIG. 17.

Referring to FIG. 20, in an optional embodiment, the emission optical component 710 includes a first lens 712, a second lens 713, a third lens 714, and a fourth lens 715. Herein, the angle reducing component includes the first lens 712, the second lens 713, and the third lens 714; and the beam expanding component includes the fourth lens 715.

This application imposes no limitation on the quantity of lenses included in the angle reducing component, provided that the angle of view of the laser beam can be reduced and the laser beam can be collimated. Similarly, this application imposes no limitation on the quantity of lenses included in the beam expanding component, provided that the emission angle of view can be increased. There are various combination forms of the emission optical component 710, which can meet more use needs.

In the foregoing embodiments, the second optical axis 711 and the first optical axis 640 may be parallel or may form an acute angle. A specific form and angle may be set flexibly according to a light emission need. When the second optical axis 711 is parallel to the first optical axis 640, it is convenient to arrange the optical path. When the second optical axis 711 and the first optical axis 640 form an acute angle, compared with the case that the second optical axis 711 and the first optical axis 640 are parallelly provided, a larger overlapped region may be set for the emission fields of view of the plurality of emission modules 700, so that there is still the point cloud in a central region of the receiving field of view when the target is at a shorter distance, and no complex structure needs to be arranged for the emission optical component, thereby realizing an effect of the case where the second optical axis 711 and the first optical axis 640 are parallel.

Figure 24:
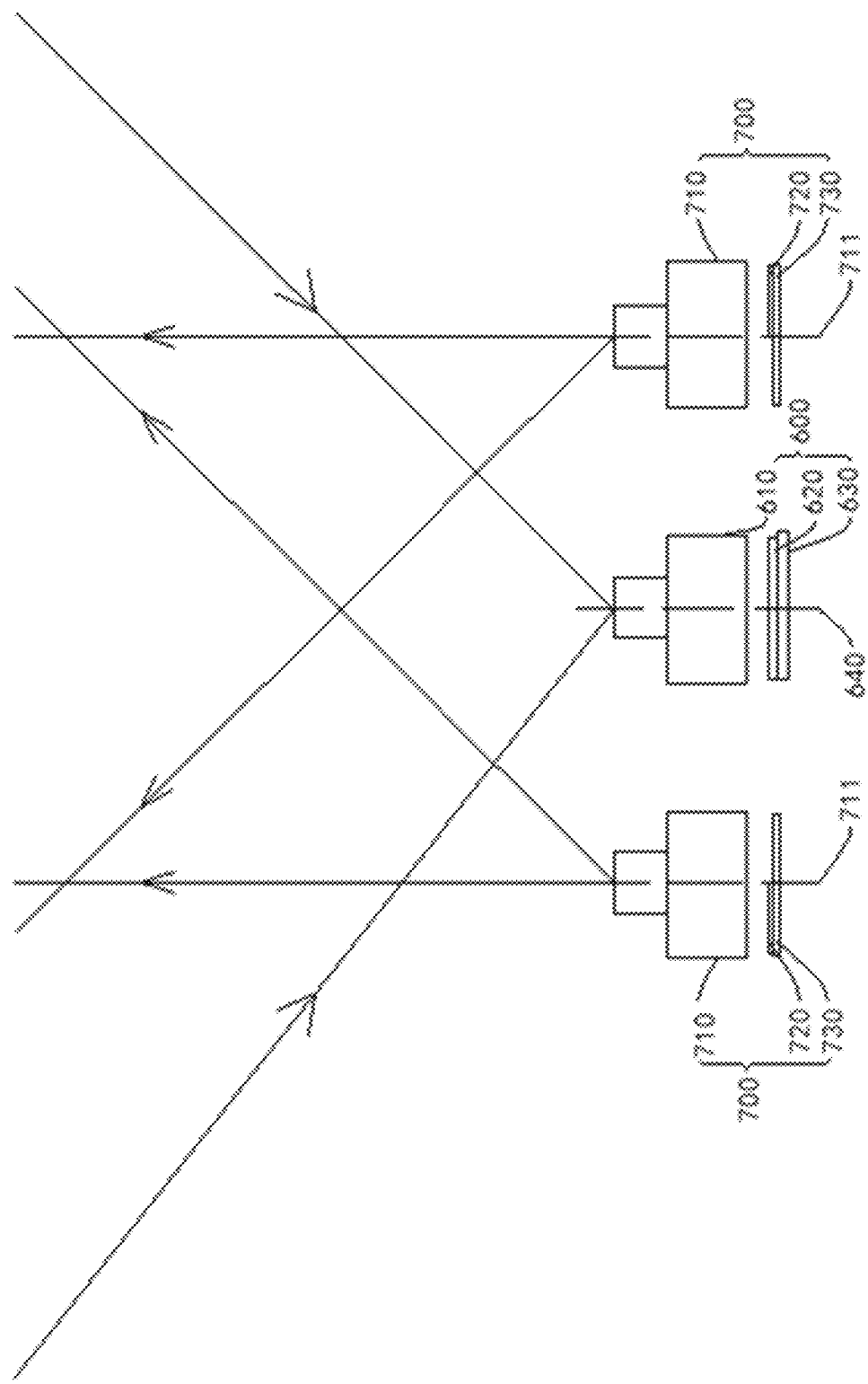
FIG. 24 is a schematic diagram of an optical path of a LiDAR according to another embodiment of this application.
Figure 25:
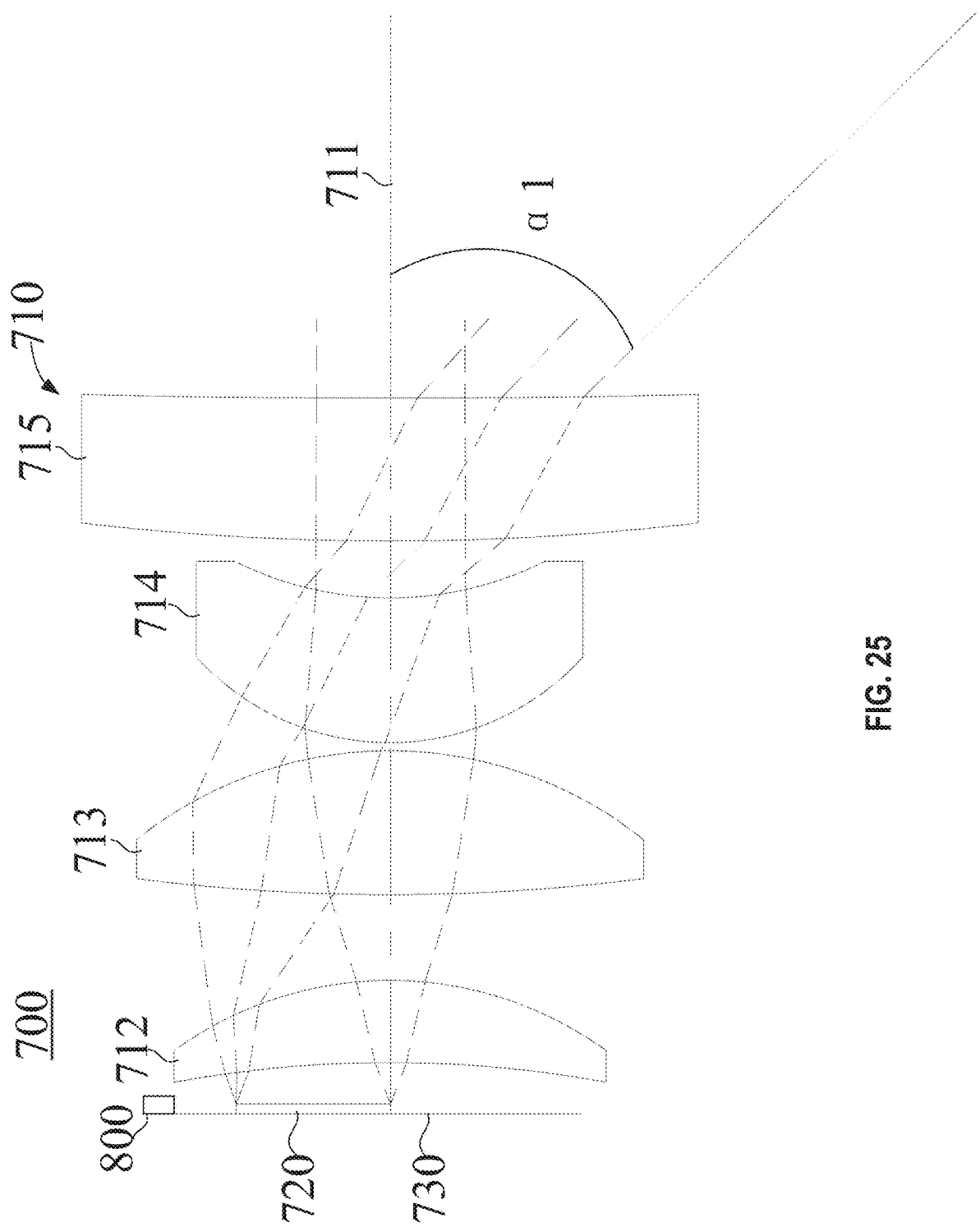
FIG. 25 is a schematic structural diagram of an emission module used in another embodiment of this application.

In the foregoing embodiments, as shown in FIG. 24, the receiving module 600 includes a receiving optical component 610, a receiving detector 620 located on an imaging side of the receiving optical component 610, and a receiving board 630 electrically connected to the receiving detector 620. The receiving optical component 610 is configured to perform beam reducing and focusing processing on the echo signal.

The receiving optical component 610 in this embodiment may include one or more lenses, and in addition to the lenses, the emission optical component may also include another optical component that can cooperate with the lenses to realize the foregoing effects, such as a prism, provided that the foregoing effects can be realized. This is not exclusively limited herein. The receiving detector 620 may include a plurality of detectors arranged in an array, and the quantity of detectors may be the same as or different from the quantity of light emitters. That is, the detectors may be arranged in a one-to-one correspondence with the light emitters in the emission module 700, or one light emitter can correspond to the plurality of detectors. This can be flexibly selected based on a receiving effect, and is not limited herein. The receiving board 630 is configured to supply power to the detector in the receiving detector 620, control turn-on and turn-off of the detector, and control the receiving detector to receive data. The receiving module 600 uses the structure in this embodiment, and therefore, has a simple structure and is easy to assemble.

In an optional embodiment, the receiving optical component includes a beam reducing component and a focusing component arranged along a transmission optical path of the echo signal. The beam reducing component includes at least one lens configured to reduce a total receiving angle of view of the echo signal. The focusing component includes at least one lens configured to focus the echo signal on the receiving detector after the angle of view is reduced by the beam reducing component.

More specifically, the beam reducing component performs light deflection processing on the echo signal, to reduce the total receiving angle of view of the echo signal. The receiving detector is located on an image focal plane of the focusing component, and is configured to focus the optical signal on the receiving detector after the angle of view is reduced by the beam reducing component.

Figure 21:
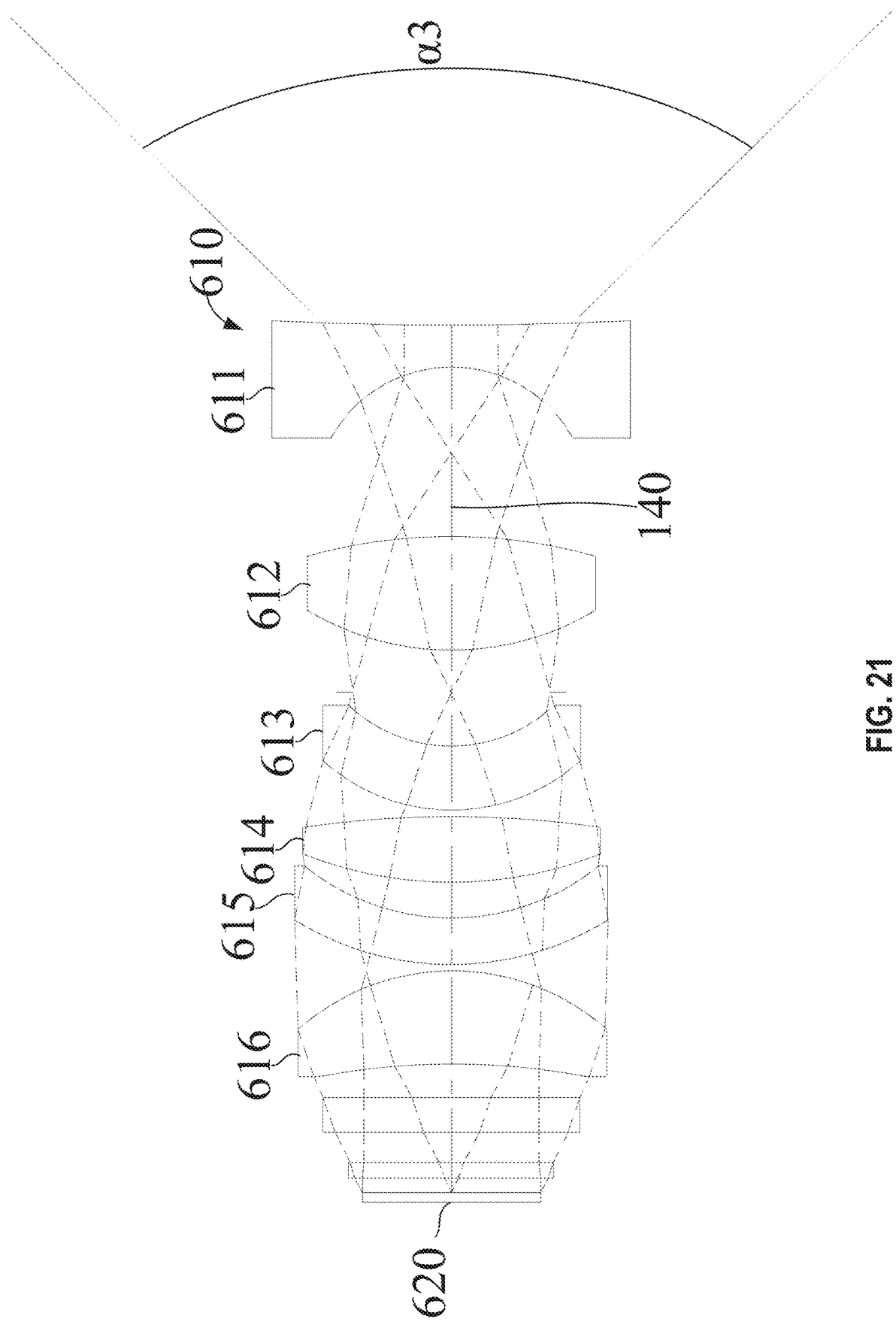
FIG. 21 is a schematic structural diagram of a receiving module used in FIG. 17.
Figure 22:
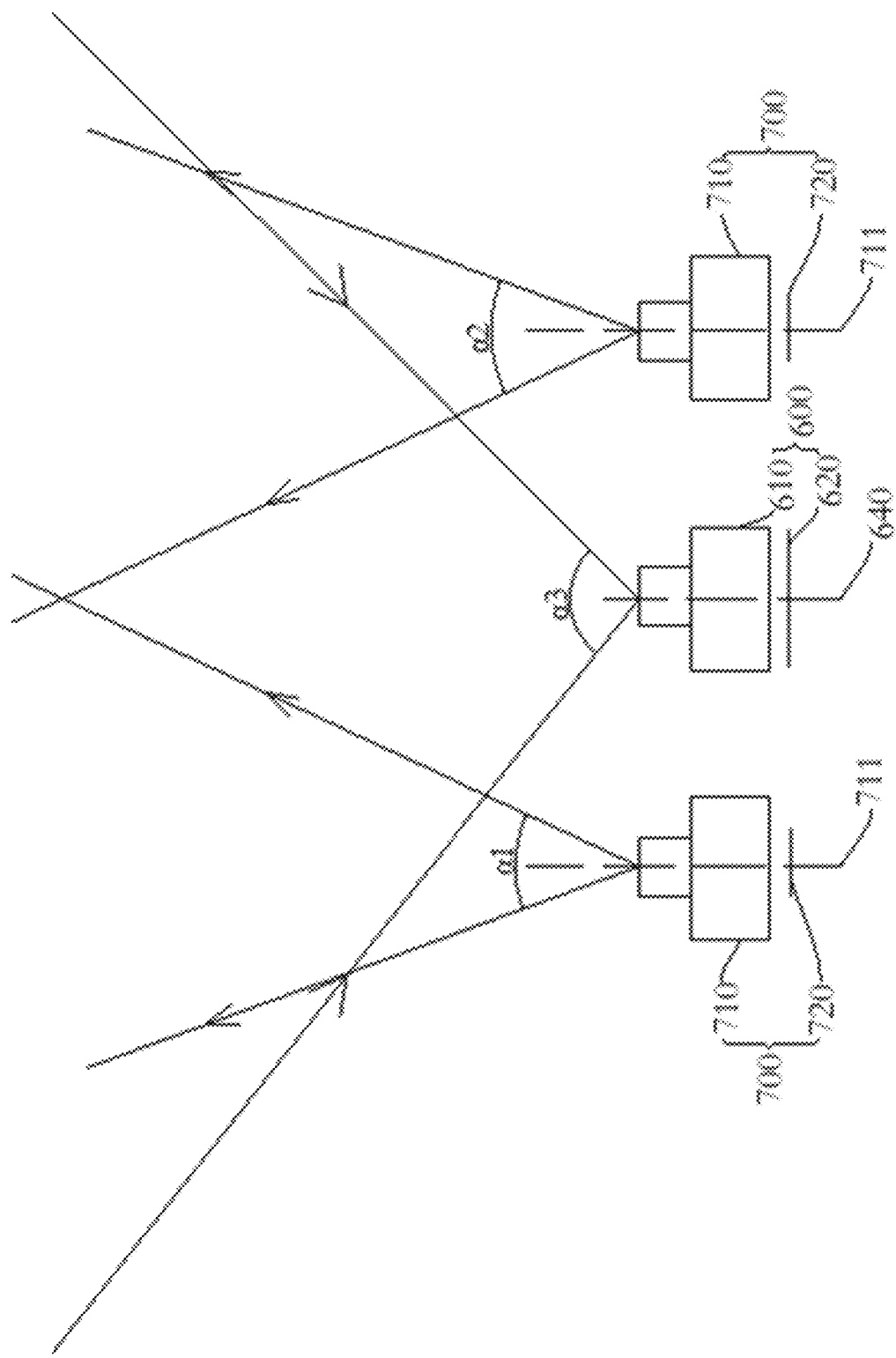
FIG. 22 is a schematic diagram of an optical path of a LiDAR according to another embodiment of this application.

As shown in FIG. 21, in an optional embodiment, the receiving optical component 610 includes a fifth lens 611, a sixth lens 612, a seventh lens 613, an eighth lens 614, a ninth lens 615, and a tenth lens 616. The beam reducing component includes the fifth lens 611, and the focusing component includes the sixth lens 612, the seventh lens 613, the eighth lens 614, the ninth lens 615, and the tenth lens 616.

This application imposes no limitation on the quantity of lenses included in the angle reducing component, provided that the angle of view of the echo signal can be reduced and an echo signal with a large angle of view can be received. Similarly, this application imposes no limitation on the quantity of lenses included in the focusing component, provided that the echo signal can be focused on the receiving detector 620. There are various combination forms of the receiving optical component 610, which can meet more use needs.

Further, to resolve a problem that ranging performance of a ranging device deteriorates because distortion of a lens in the emission optical component does not match that of a lens in the receiving optical component, distortion of the emission optical components 710 of the plurality of emission modules 700 provided in the embodiments of this application matches that of the receiving optical component 610 of the receiving module 600.

Specifically, each emission optical component 710 includes at least one lens, and satisfies the following conditional formula: $|m1| \leq 0.25\%$, where m1 is f-theta distortion of the emission optical component 710, and $|m1|$ is an absolute value of the f-theta distortion of the emission optical component 710. An emission lens 112 satisfies the following conditional formula 1: $m1=[(f1*\theta1-f1*\tan\theta1)/f1*\theta1]*100\%$, where in the formula, f1 is an effective focal length of the emission optical component 710, and is measured in mm; and $\theta1$ is a total emission angle of view of the emission optical component 710, where $0<\theta1<71$ It can be learned from the foregoing conditional formula 1 that the f-theta distortion m1 of the emission optical component 710 is related to the effective focal length f1 and the total emission angle of view $\theta1$ of the emission optical component 710. The effective focal length f1 and the total emission angle of view $\theta1$ of the emission optical component 710 are properly designed, so that the absolute value of the f-theta distortion of the emission optical component 710 can be less than or equal to 0.25%, which has a simple principle and is easy to design.

Specifically, the receiving optical component 610 includes at least one lens, and satisfies the following conditional formula: $|n1| \leq 0.25\%$, where n1 is f-theta distortion of the receiving optical component 610, and $|n1|$ is an absolute value of the f-theta distortion of the receiving optical component 610. The receiving optical component 610 further satisfies the following conditional formula 2: $n1=[(f2*\theta2-f2*\tan\theta2)/f2*\theta2]*100\%$, where in the formula, f2 is an effective focal length of the receiving optical component 610, and is measured in mm; and $\theta2$ is a total receiving angle of view of the receiving optical component 610, where $0<\theta2<\pi$. It can be learned from the foregoing conditional formula 2 that the f-theta distortion of the receiving optical component 610 is related to the effective focal length f2 and the total receiving angle of view $\theta2$ of the receiving optical component 610. The effective focal length f2 and the total receiving angle of view $\theta2$ of the receiving optical component 610 are properly designed, so that the absolute value of the f-theta distortion of the receiving optical component 610 can be less than or equal to 0.25%, which has a simple principle and is easy to design.

In the LiDAR provided in this application, the absolute value of the f-theta distortion of the emission optical component 710 and the absolute value of the f-theta distortion of the receiving optical component 610 are controlled to be less than or equal to 0.25%, so that distortion of the emission lens matches that of the receiving lens, thereby resolving the problem that the ranging performance of the ranging device deteriorates because distortion of the emission lens does not match that of the receiving lens in a related art.

In the foregoing embodiments, structures of the emission optical component 710 and the receiving optical component 610 may be the same or different. When the two structures are the same, an assembling direction of the emission optical component 710 along a laser beam optical path is the opposite of an assembling direction of the receiving optical component 610 along the echo signal optical path. This not only facilitates designing and mounting, but also facilitates distortion matching of the emission lens and the receiving lens, so that the absolute value of the f-theta distortion of the emission lens and the absolute value of the f-theta distortion of the receiving lens are controlled to be less than or equal to 0.25%, thereby resolving the problem in the related art that the ranging performance of the ranging device deteriorates because distortion of the emission lens does not match that of the receiving lens.

Figure 26:
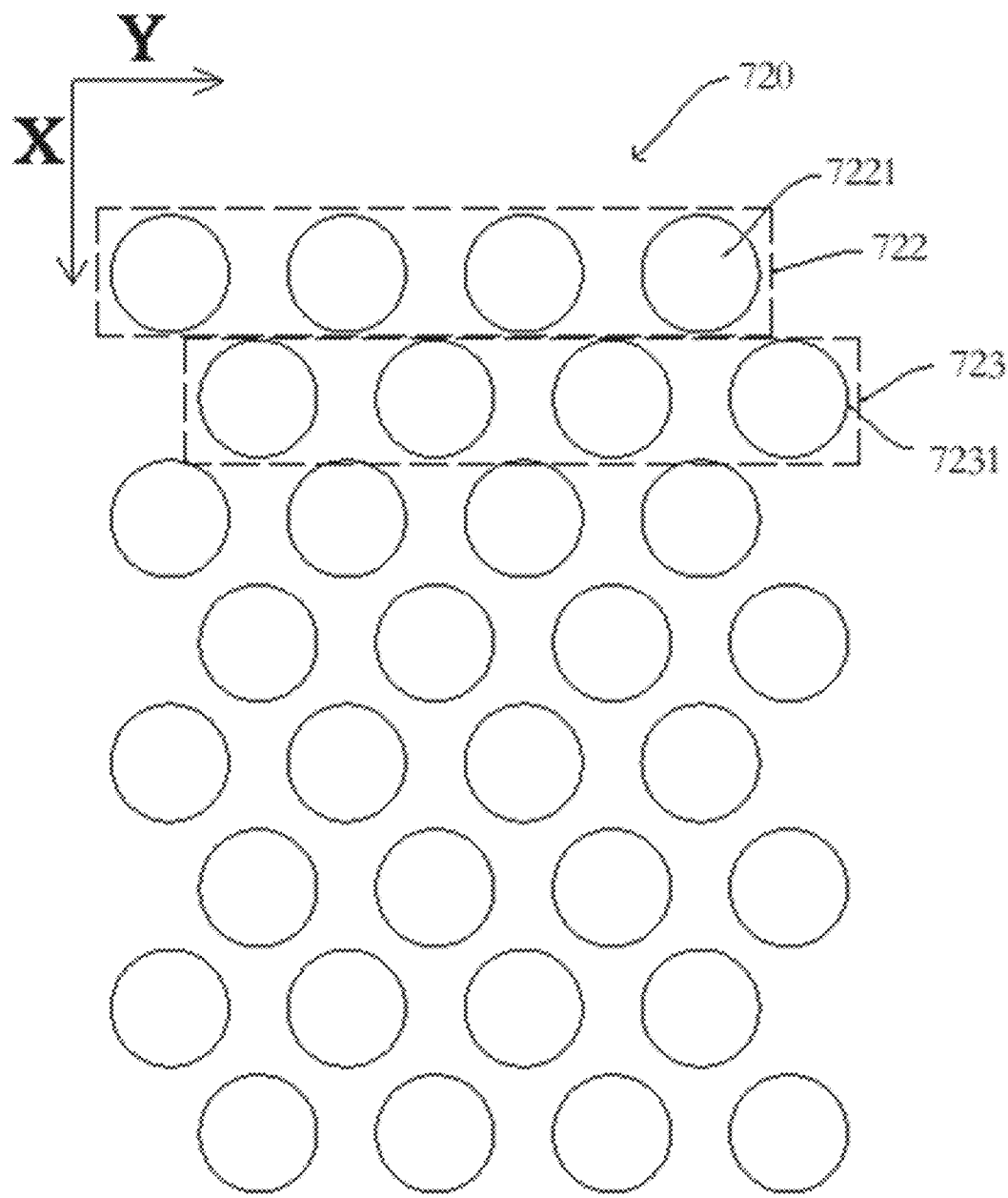
FIG. 26 is a schematic diagram of a position relationship between a first light emission unit and a second light emission unit used in an embodiment of this application.

In an optional embodiment, as shown in FIG. 26, the laser 720 includes a first light emission unit 722 and a second light emission unit 723 that are alternately arranged along a first direction. The first light emission unit includes first light sources 7221 spaced along a first direction, and the second light emission unit includes second light sources 7231 spaced along a second direction. The second light source 7231 is located between two adjacent first light sources 7221, and the second direction is perpendicular to the first direction. The emission module 700 further includes emission boards 730 electrically connected to the lasers 720 in a one-to-one correspondence manner. The emission board 730 is configured to drive each light source in the laser 720 to emit light in a preset timing sequence.

Figure 28:
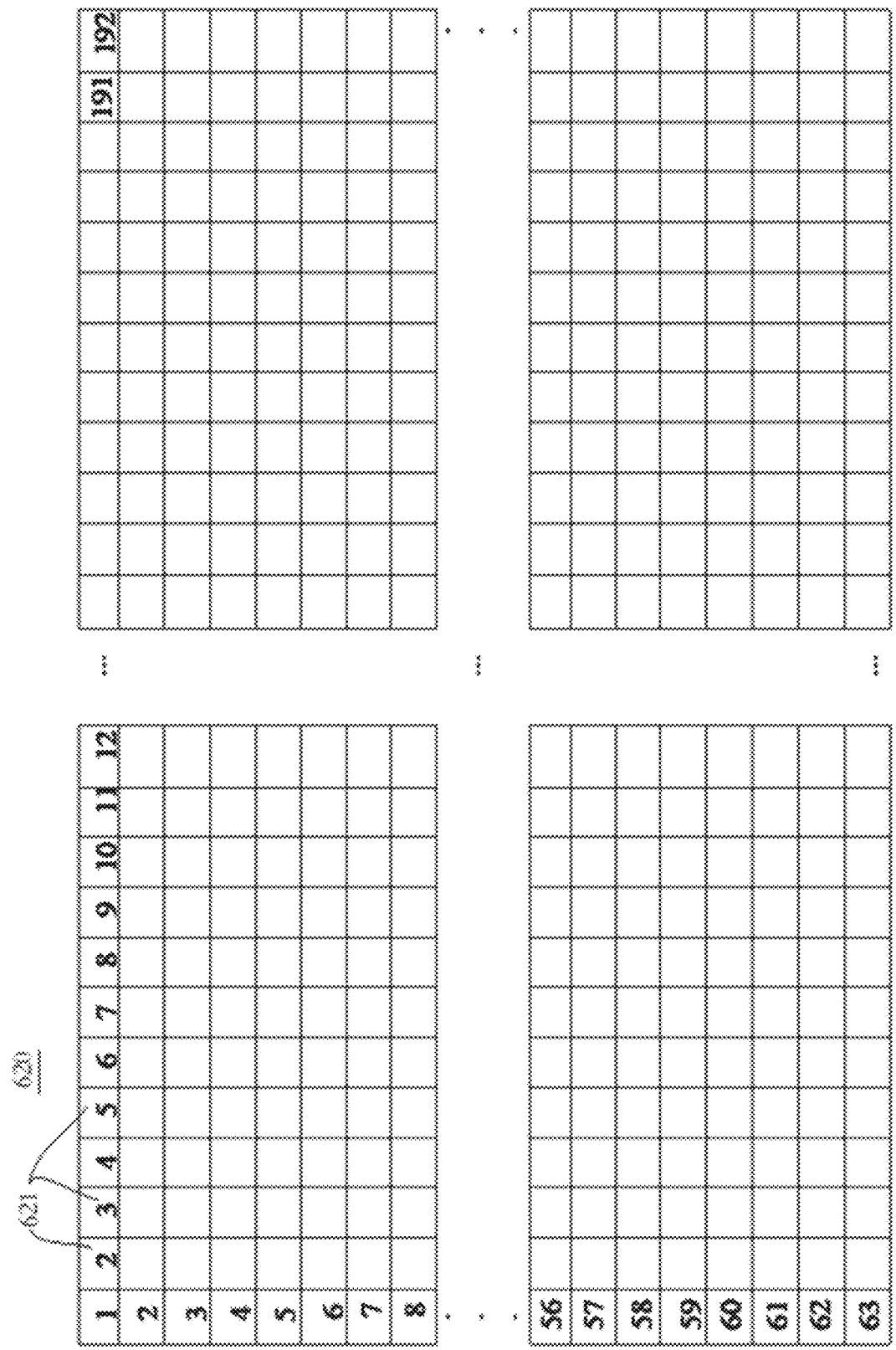
FIG. 28 is a schematic diagram of arrangement of a receiving unit in a receiving detector used in an embodiment of this application.

As shown in FIG. 28, the receiving detector 620 includes a plurality of receiving units 621 distributed on a receiving board 630 in a two-dimensional array; and the receiving board 630 is configured to drive the receiving units 621 to receive echo signals in a preset timing sequence.

Any light source corresponds to the plurality of receiving units 621 arranged in the two-dimensional array, and all light sources are combined to form a light emission region.

Specifically, the laser 720 in this embodiment may be formed by one emission chip, or may be formed by splicing the plurality of light emission chips, and a first light emission unit and a second light emission unit may be arranged on each light emission chip. When the laser 720 is formed by splicing the plurality of light emission chips, a horizontal angle of view, a vertical angle of view, and both the horizontal angle of view and the vertical angle of view at the same time of the plurality of light emission chips can be spliced. In addition, angles of view of the plurality of LiDARs can also be spliced. Similarly, the horizontal angle of view, the vertical angle of view, and both the horizontal angle of view and the vertical angle of view at the same time can be spliced. When the angles of view of the plurality of LiDARs are spliced, it should be noted that at a close distance, a light spot of the LiDAR is shifted toward the central field of view, and as a result, there is a region without light at an edge field of view. In this case, it should be ensured that when angles of view of two connected LiDARs are spliced, at least edge fields of view at the close distance are overlapped. That is, the overlapped angles of view of the two connected LiDARs at a long distance are at least within a range of an edge field of view without point cloud at the close distance. Alternatively, edge fields of view of the plurality of LiDARs may be overlapped, and overlapped pixels can be spliced based on the number of shifted pixels at the closest measurement distance, so that there is no gap for splicing of the fields of view of the plurality of LiDARs.

In actual application, the first light source 7221 and the second light source 7231 may be continuous light sources or pulsed light sources; and the first light source 7221 and the second light source 7231 may be a combination of one or more of a light-emitting diode (LED), a laser diode (LD), a vertical-cavity surface-emitting laser (VCSEL), and the like. This embodiment imposes no limitation on the type of light source. The receiving unit 621 in this embodiment is a laser detector, and each receiving unit 621 may include one or more laser detectors, which may be flexibly selected based on actual needs. The laser detector may be a combination of one or more of an avalanche photodiode (APD), a single photon avalanche diode (SPAD), a silicon photomultiplier (SiPM), a multi-pixel photon counter (MPPC), and the like.

By using the laser 720 provided in this embodiment, more light sources can be arranged in a limited space, which can effectively enlarge an arrangement area of the light sources on the emission board 730 and increase the amount of point cloud received by the receiving module 600 per unit area, thereby improving detection precision of the LiDAR. In addition, one light source corresponds to a plurality of receiving units 621, which can effectively reduce the possibility of omitting point cloud, thereby further improving detection precision of the LiDAR.

In an optional embodiment, to facilitate the splicing design of the receiving angle of view and the emission angle of view, light emission units in the same column have the same emission angle of view and/or light emission units in the same row have the same emission angle of view; and receiving units in the same column have the same receiving angle of view and/or receiving units in the same row have the same receiving angle of view.

Figure 27:
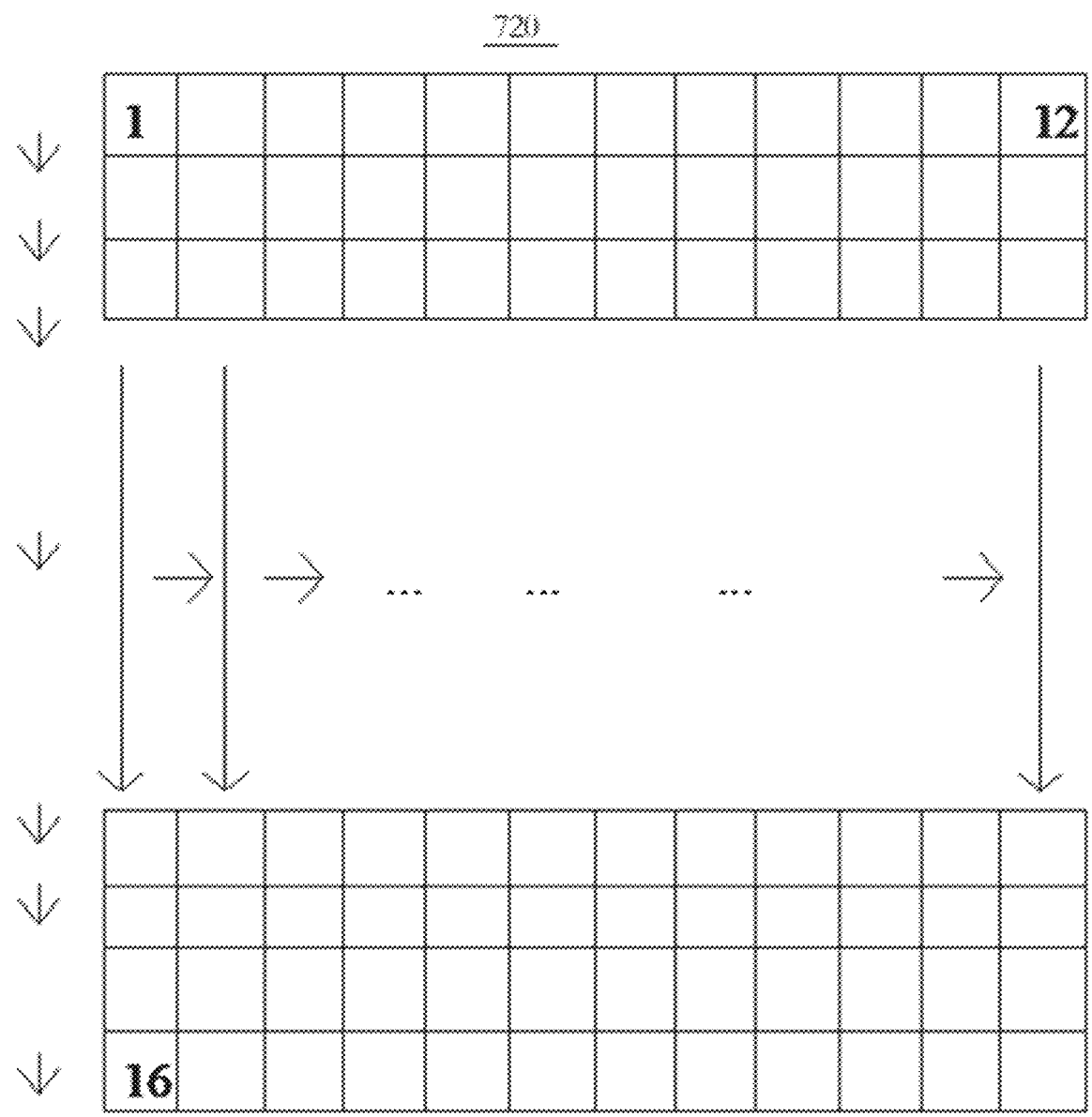
FIG. 27 is a schematic diagram of arrangement of a light source in a laser used in another embodiment of this application.

Referring to FIG. 27 and FIG. 28, in another embodiment of the present application, a LiDAR detection method is provided, where based on the LiDAR provided in the foregoing embodiments, the method includes the following steps.

S1. Obtain a distance to a target.

Specifically, the distance to the target can be detected by using the LiDAR.

S2. Calculate a pixel shifting parameter based on the distance to the target, where the pixel shifting parameter includes any one of a pixel shifting angle, a shifting size, and a number of shifted pixels.

Specifically, a shifting level of the pixel can be derived according to the following formulas: $\theta=\arctan(\text{baseline}/l)$, $H=f\theta$, and $n=H/s$, where $\theta$ is a radian, baseline is a distance between the first optical axis 640 and the second optical axis 711, $l$ is a measured distance, $f$ is a focal length of the receiving optical component 610, $n$ is a number of shifted pixels, and $s$ is a pixel size of the receiving detector. $\theta$, $H$, and $n$ can all represent a shifting level; $\theta$ represents the shifting angle, $H$ represents the shifting size, and $n$ represents an integer obtained by dividing the shifting size by a received pixel size.

In the foregoing formula, the baseline is already determined after a LiDAR model is determined or before measurement, and $l$ is the distance to the target. During detection, the foregoing formulas, the known distance between the first optical axis 640 and the second optical axis 711, and the detected distance to the target can be used to calculate shifting parameters such as the pixel shifting angle, the shifting size, and the number of shifted pixels.

S3. Determine a correspondence between each light source in the emission module and each receiving unit in the receiving module based on the pixel shifting parameter.

Because light sources in the emission module are in a one-to-one correspondence with receiving units in the receiving module, when a specific light source X emits light, a receiving unit Y on the receiving module that is in a one-to-one correspondence with the light source X receives the light. However, at a short distance, because a position of the laser beam emitted by the light source X is shifted on the receiving detector, to detect the laser beam emitted by the light source X, the receiving unit Y cannot be used for receiving the laser beam. In this case, an internal control system inside the LiDAR adaptively schedules the receiving units. For example, at a distance D1, the receiving unit Y1 is configured to receive the laser beam from the light source X; at a distance D2, the receiving unit Y2 is configured to receive the laser beam from the light source X; or at a distance D3, the receiving unit Y3 is configured to receive the laser beam from the light source X. Because a relationship between the shifting and the distance can be calculated according to the foregoing calculation formula, a look-up table can be stored in a data processing system according to the formula, and the look-up table stores a correspondence between the distance D and the receiving unit. The control system can select, through matching, a different receiving unit for receiving the laser beam based on a different distance, so that each echo signal reaching a region in which the receiving unit is located can be received by a corresponding receiving unit, and an irrelevant receiving unit may not be started, thereby avoiding a waste of power.

S4. Control light sources in the emission module to emit light in the preset timing sequence, and further control each receiving unit in the receiving module to receive an echo signal in a corresponding time interval based on the correspondence with each light source, where the corresponding time interval is a preset time interval after the corresponding light source emits the light.

Specifically, herein, sequentially emitting light in the preset timing sequence may mean that light sources on a specific preset track emit light in sequence according to the preset track, or may emit light in sequence row by row or column by column, or a light emission sequence of light sources can also be independently set, so that the light sources sequentially emit light in the foregoing light emission sequence, which can be specifically flexibly selected according to an actual need. This is not exclusively limited herein.

The foregoing preset time interval may be 1 s, 5 s, or another time period after the light source emits light, which can be specifically flexibly determined according to a receiving effect.

For ease of understanding, an example is provided.

The LiDAR includes two emission modules, and the two emission modules are respectively arranged on opposite sides of the receiving module. FIG. 27 is a schematic diagram of a laser. FIG. 28 is a schematic diagram of a receiving detector. Taking emission chips in 16*12 columns as an example, an emission sequence is that the first column of emission chips emit light first, then the second column, . . . , the 12th column (in a direction from left to right in the figure); and for each column, the first block emits light first, then the second block, . . . , the 16th block in sequence (in a direction from top to bottom in the figure).

At the distance D1 to the target, a configuration could be arranged, so that when the first block in the first column of the emission module on the right side emits a laser beam, the first batch of 4*8 (rows 1-4*columns 1-8) receiving units in the first group in the receiving detector receive the laser beam, or when the second block in the first column of the emission module on the right side emits a laser beam, then the second batch of 4*8 (rows 5-8*columns 1-8) receiving units in the first group in the receiving detector receive the laser beam, . . . , or when the 16th block in the emission module on the right side emits a laser beam, the 16th batch of 4*8 (rows 61-64*columns 1-8) receiving units in the first group in the receiving detector receive the laser beam.

When the first block in the second column of the emission module on the right side emits a laser beam, the first batch of 4*8 (rows 1-4*columns 9-16) receiving units in the second group in the receiving detector receive the laser beam, or when the second block in the first column emits a laser beam, then the second batch of 4*8 (rows 5-8*columns 9-16) receiving units in the second group in the receiving detector receive the laser beam, . . . , or when the 16th block emits a laser beam, the 16th batch of 4*8 (rows 61-64*columns 9-16) receiving units in the second group in the receiving detector receive the laser beam.

By analogy, the 12th column of light sources emit light, where 12*8=96 columns. Therefore, 96 columns of receiving units on the left side of the receiving detector can receive echo signals corresponding to the 12 columns of light sources. Because there are two emission modules, there are at least 96*2=192 columns of receiving units in the receiving detector.

At the distance D2 to the target, D2 is less than D1, a position of an echo signal corresponding to the same laser beam on the receiving module is shifted, specifically, to a side away from a corresponding light source, and therefore, a correspondence between the light source and the receiving unit also needs to be adjusted correspondingly. For example, at the distance D1 to the target, receiving units in rows 1-4 are configured to receive a laser beam emitted by the first block of light sources; at the distance D2 of the target, receiving units in rows 2-5 need to be scheduled to receive a laser beam; or at the distance D3 to the target (D3 is less than D2), receiving units in rows 2-6 may need to receive a laser beam. The foregoing correspondence can be stored as the look-up table into an embedded data processing system of the LiDAR or a data processing system connected to the LiDAR. During the use, after the corresponding pixel shifting parameter is calculated, the look-up table is searched, to find the correspondence between the light source and the receiving unit that is corresponding to the corresponding pixel shifting parameter, and a working state of the LiDAR is adaptively adjusted based on the correspondence, thereby realizing precise detection.

The LiDAR detection method provided in this embodiment of the present application is implemented based on the LiDAR provided in the foregoing embodiments, which can further avoid the lack of point cloud in the central field of view of the receiving module while ensuring the small size of the single laser. In addition, in the LiDAR detection method provided in this embodiment of the present application, the correspondence between the light source and the receiving unit can be adaptively adjusted based on the distance to the target (that is, a pixel shifting level), to implement precise control of the receiving unit, thereby avoiding a waste of power.

The same or similar reference signs in the drawings of the embodiments correspond to the same or similar components. In descriptions of this application, it should be understood that orientation or position relationships indicated by terms such as "above," "under," "left," and "right" are based on the orientation or position relationships shown in the accompanying drawings, are merely intended to describe this application and simplify the descriptions, but are not intended to indicate or imply that the specified device or component shall have specific orientation or be formed and operated in specific orientation, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:
1. A LiDAR detection method, comprising:
   obtaining a distance to a target;
   calculating a pixel shifting parameter based on the distance to the target, wherein the pixel shifting parameter includes any one of a pixel shifting angle, a shifting size and the number of shifted pixels;

determining a correspondence between a laser in the emission module and a receiving sensor in the receiving module based on the pixel shifting parameter; and controlling the lasers in the emission module to emit light in the preset timing sequence, and further controlling the receiving sensor in the receiving module to receive an echo signal in a corresponding time interval based on the correspondence with the laser, where the corresponding time interval is within a preset time interval after the corresponding laser emits the light.

2. The LiDAR detection method to claim 1, wherein the pixel shifting parameter is derived according to the following formulas:

$\theta$=artan(baseline/l), H=f$\theta$, and n=H/s, where $\theta$ is a radian, baseline is a distance between the first optical axis and the second optical axis, l is a measured distance, f is a focal length of a receiving optical component, n is a number of shifted pixels, and s is a pixel size of the receiving detector; $\theta$ represents a shifting angle, H represents the shifting size, and n represents an integer obtained by dividing the shifting size by a received pixel size.

3. The LiDAR detection method to claim 1, wherein controlling the lasers in the emission module to emit light in the preset timing sequence, comprising:

controlling the lasers on a specific preset track emit light in sequence according to the preset track; or controlling the lasers emit light in sequence row by row or column by column.

* * * * *